(12) United States Patent
Hyde

(10) Patent No.: US 7,279,635 B2
(45) Date of Patent: Oct. 9, 2007

(54) QUICK CONNECTING UNIVERSAL ELECTRICAL BOX AND WIRING SYSTEM

(75) Inventor: G. Douglas Hyde, Ottawa (CA)

(73) Assignee: Electec Limited, Ottawa (CA)

( * ) Notice: Subject to any disclaimer, the term of this patent is extended or adjusted under 35 U.S.C. 154(b) by 190 days.

(21) Appl. No.: 11/050,876

(22) Filed: Feb. 3, 2005

(65) Prior Publication Data

US 2005/0126813 A1 Jun. 16, 2005

Related U.S. Application Data

(60) Division of application No. 10/220,448, filed as application No. PCT/CA01/00192 on Feb. 21, 2001, now Pat. No. 6,857,903, which is a continuation of application No. 09/514,775, filed on Feb. 28, 2000, now Pat. No. 6,376,770.

(51) Int. Cl.
   *H01H 9/02* (2006.01)
(52) U.S. Cl. .............................. 174/58; 174/58; 174/63; 439/598; 248/343
(58) Field of Classification Search .................. 174/58, 174/50, 63, 17 R; 248/906, 343; 361/600, 361/641; 33/528; 439/535, 598, 828; 220/3.8, 220/4.02, 3.6
   See application file for complete search history.

(56) References Cited

U.S. PATENT DOCUMENTS 3,622,029 A * 11/1971 Ware .......................... 220/3.7

| | | | |
|---|---|---|---|
| 4,098,423 A | | 7/1978 | Marrero |
| 4,775,802 A | * | 10/1988 | Dods .......................... 307/147 |
| 5,021,009 A | | 6/1991 | Cox |
| 5,434,359 A | * | 7/1995 | Schnell ........................ 174/58 |
| 5,828,002 A | | 10/1998 | Fedun |
| 5,866,845 A | * | 2/1999 | Markiewicz et al. .......... 174/57 |
| 6,376,770 B1 | | 4/2002 | Hyde |
| 6,857,903 B2 | | 2/2005 | Hyde |

FOREIGN PATENT DOCUMENTS

| | | |
|---|---|---|
| CA | 712668 | 6/1965 |
| DE | 19618818 | 11/1997 |
| DE | 19735703 | 2/1999 |

* cited by examiner

*Primary Examiner*—Dhiru R. Patel
(74) *Attorney, Agent, or Firm*—Schwegman, Lundberg & Woessner, P.A.

(57) ABSTRACT

A quick connecting universal electrical box system for the mounting of electrical sockets, switches or any electronic or communication component that is typically installed into a wall is disclosed. The system comprises a mounting frame and an electrical box, which can be pre-wired with any socket unit or component, such that installation of the electrical box into a wall is greatly simplified. The mounting frame is first inserted into a wall, followed by insertion of the electrical box into the mounting frame. The action of inserting the electrical box into the mounting frame forces flaps in the mounting frame to engage and lock the mounting frame into the wall. Retaining studs formed on flexible side panels of the electrical box then engage with corresponding openings in the mounting frame to secure the electrical box within the mounting frame. Secure installation of this electrical box is simple and quick without the need for any tools or fastening screws.

20 Claims, 39 Drawing Sheets

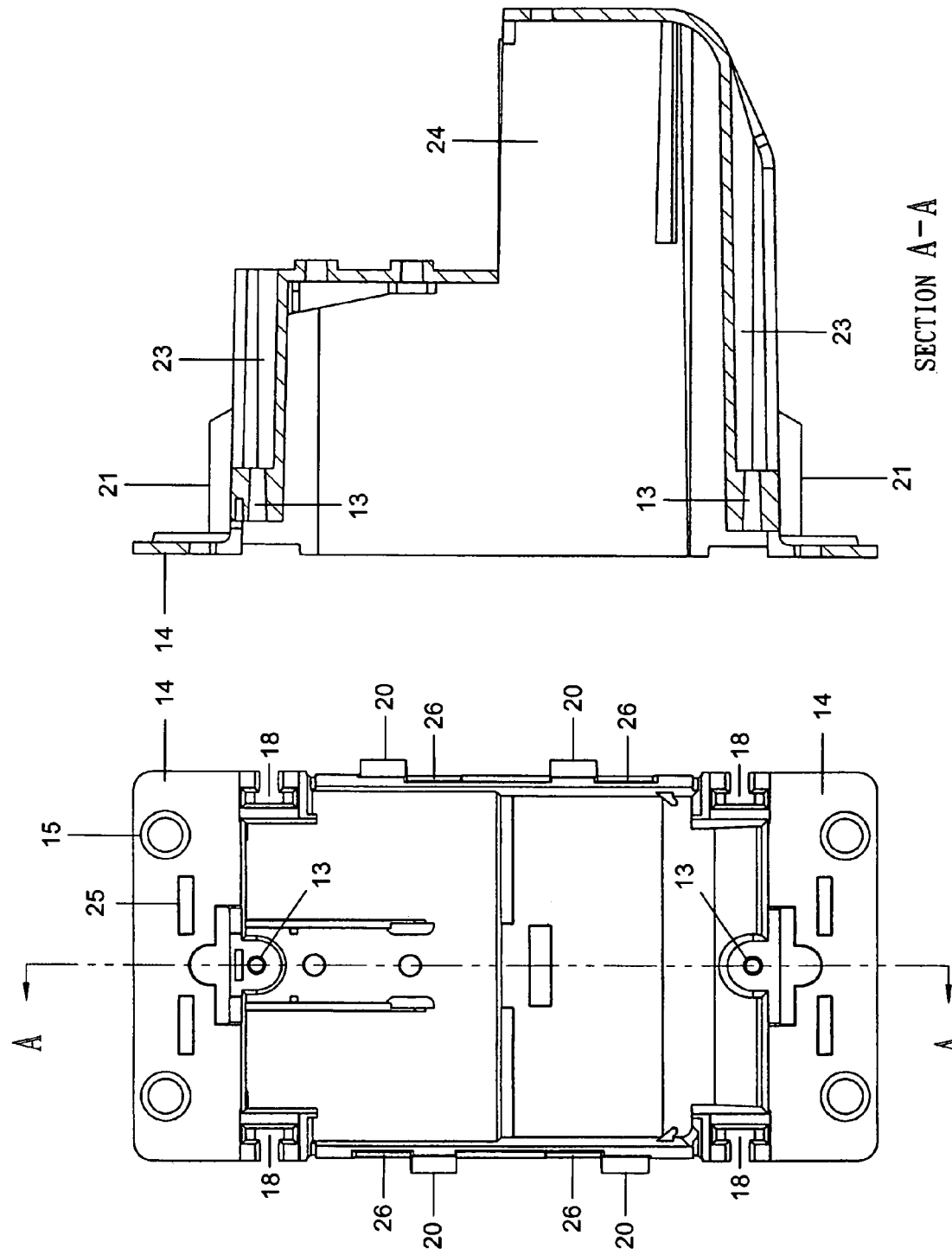

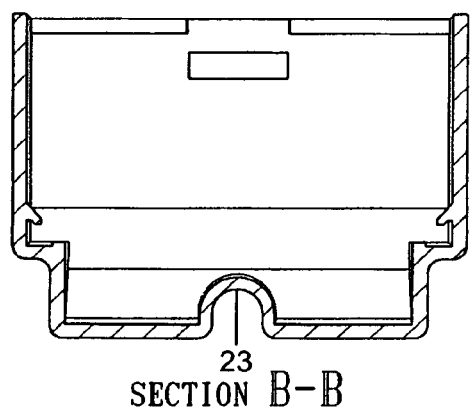
SECTION B-B
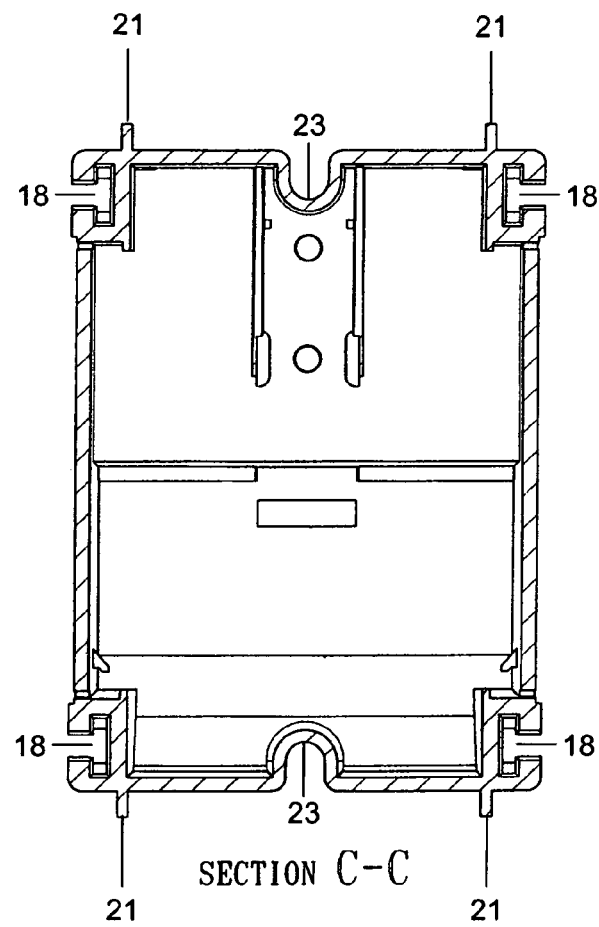
SECTION C-C
Figure 13
Figure 14

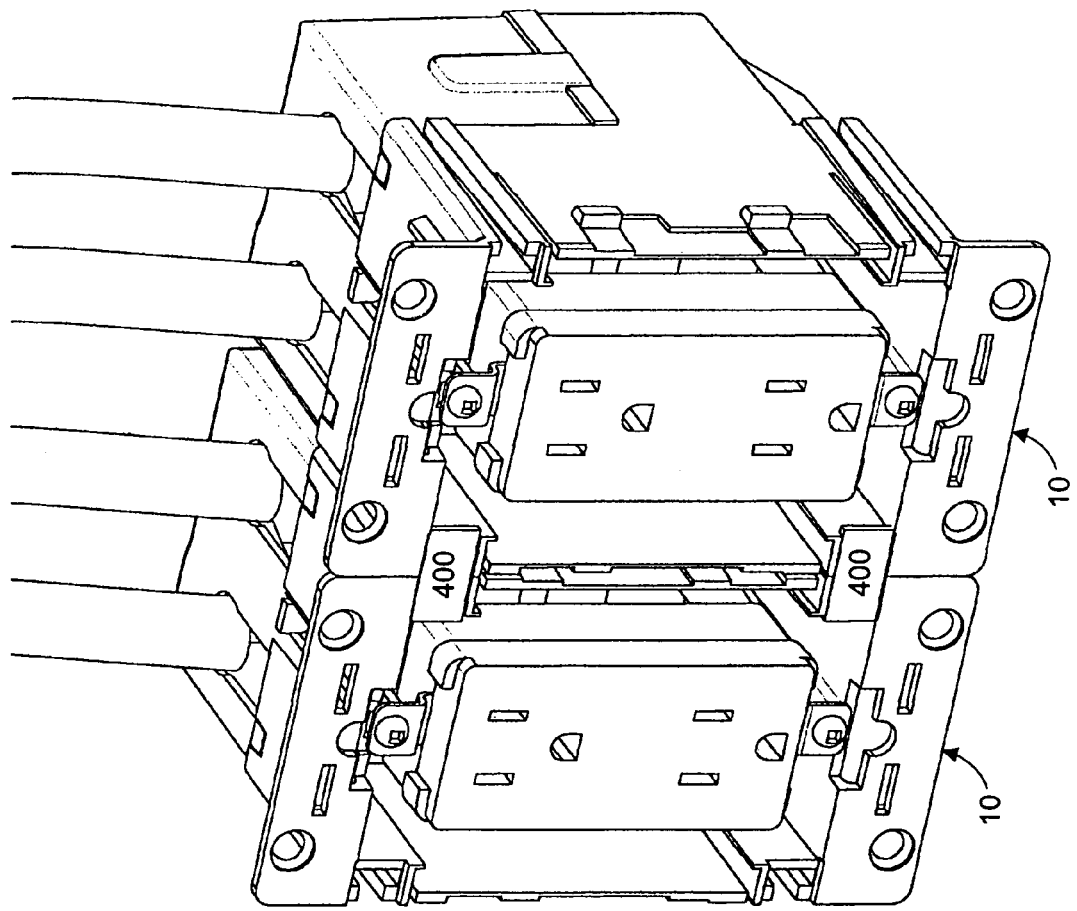

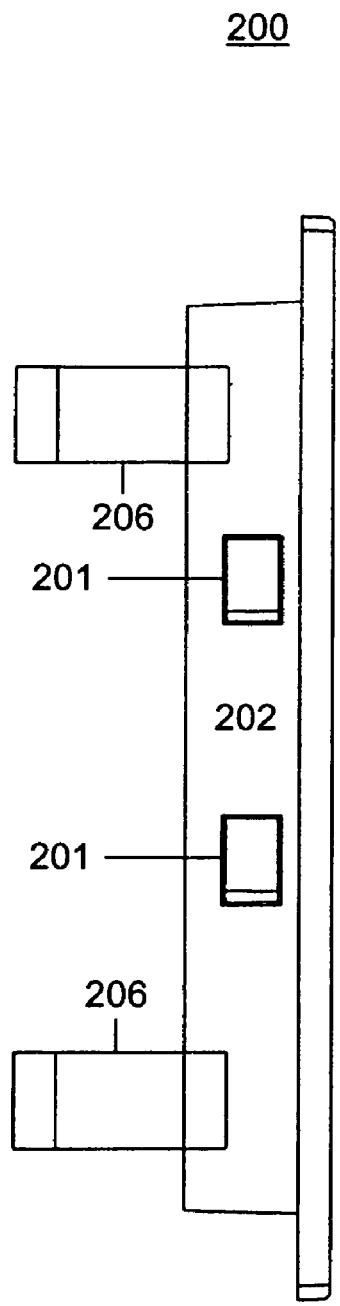
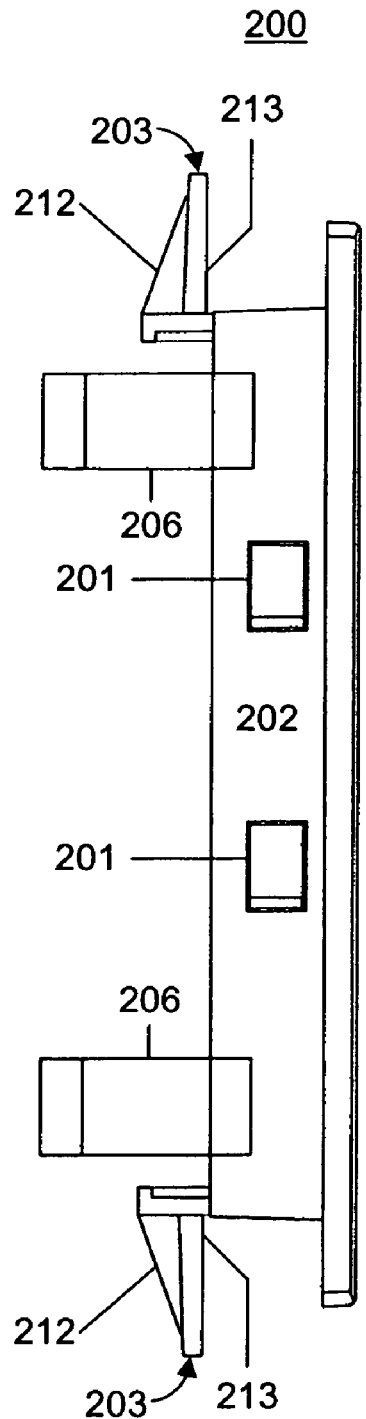
Figure 19                  Figure 20

SECTION D - D

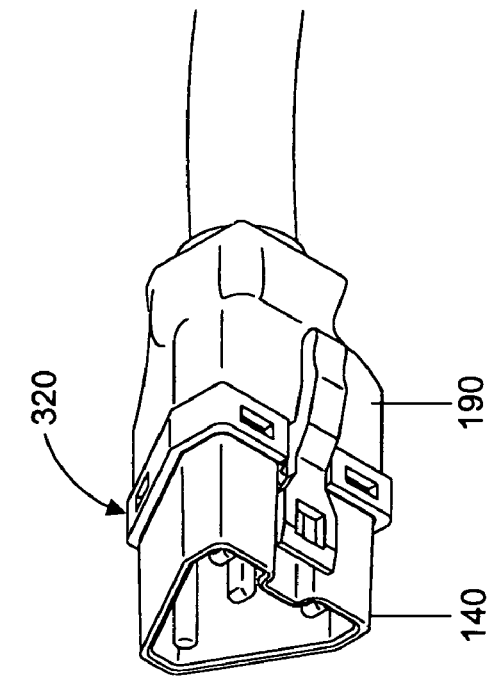
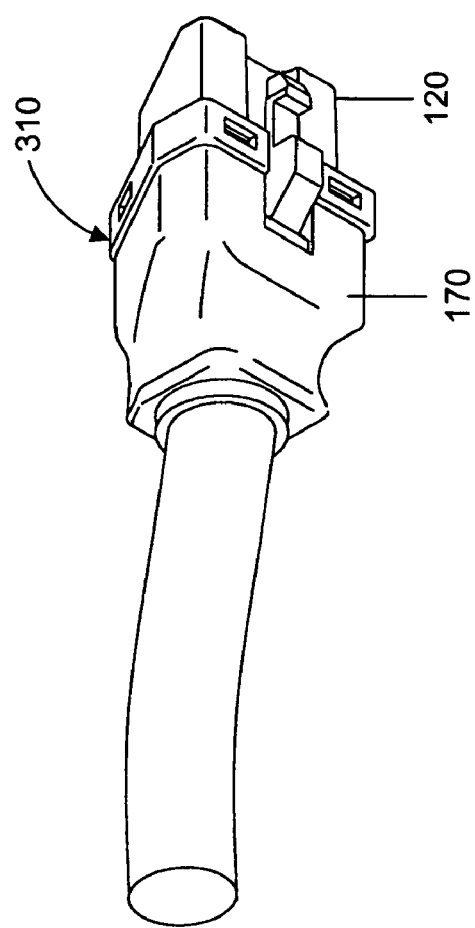
Figure 38

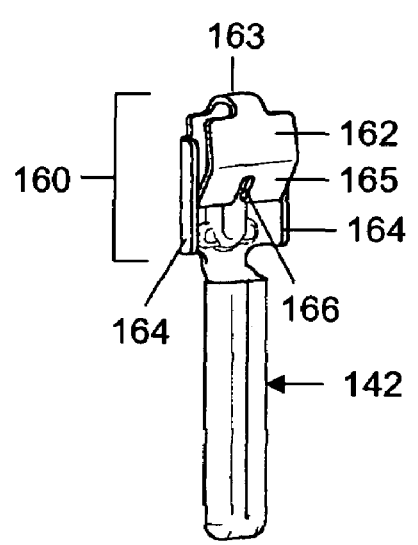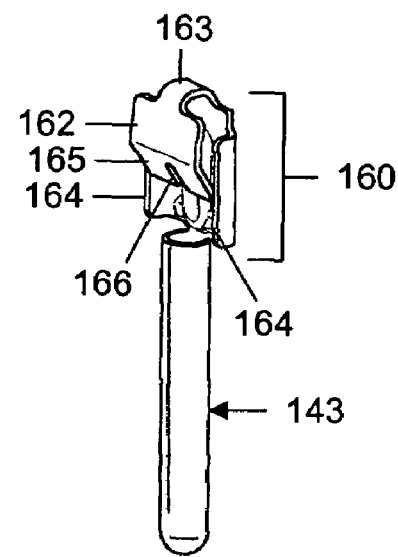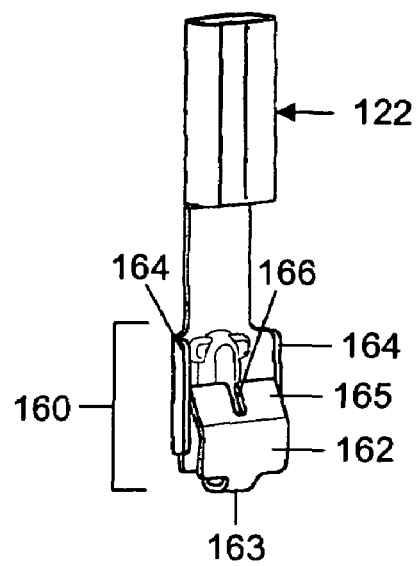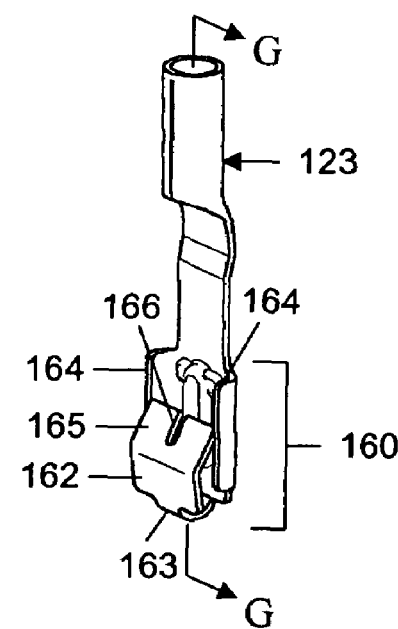
Figure 42  Figure 43

SECTION G-G

SECTION E-E

SECTION F-F

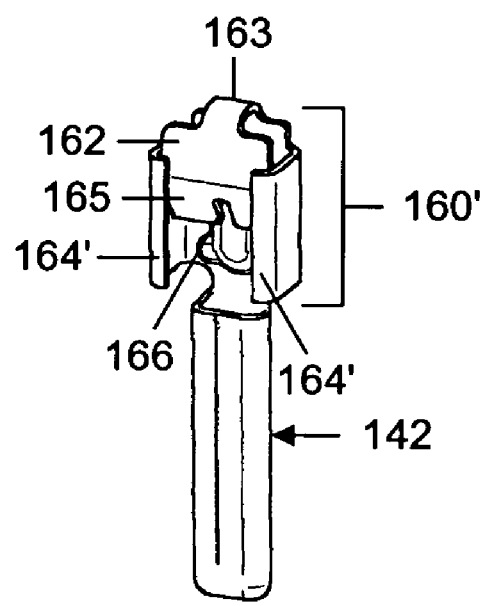
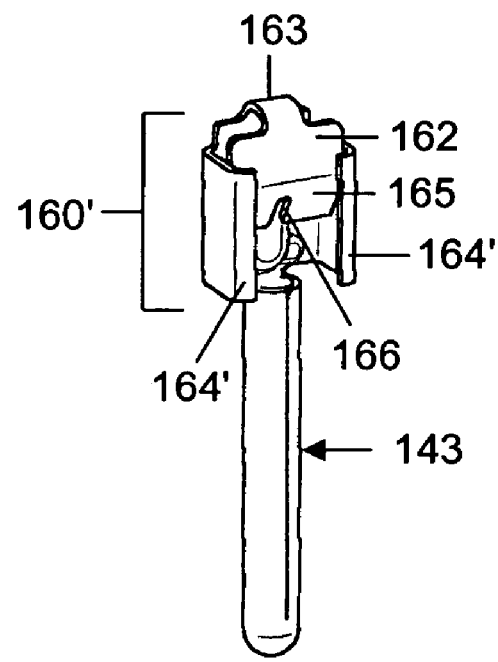
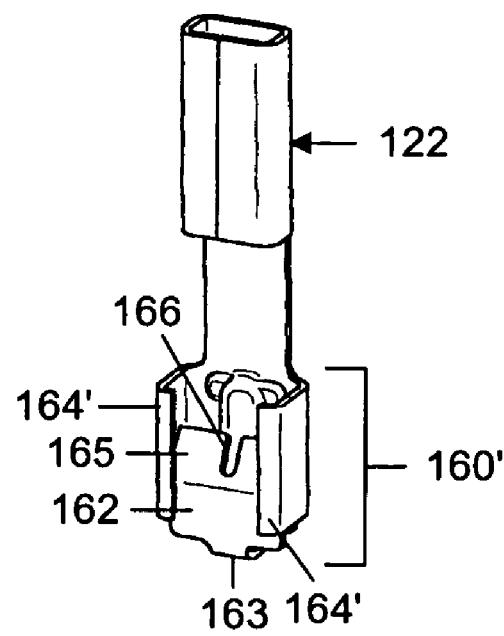
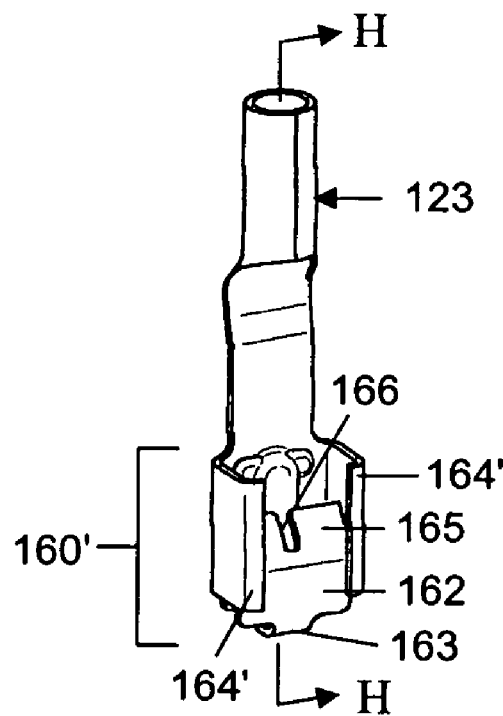
Figure 49
Figure 50

SECTION H-H

SECTION E-E

SECTION F-F

QUICK CONNECTING UNIVERSAL ELECTRICAL BOX AND WIRING SYSTEM

CROSS REFERENCE TO RELATED APPLICATIONS

This application is a divisional of U.S. patent application Ser. No. 10/220,448 filed on Feb. 21, 2001 (international filing date), which is a national entry application of PCT/CA01/00192, filed Feb. 21, 2001, now U.S. Pat. No. 6,857,903 which is a continuation of Ser. No. 09/514,775, now U.S. Pat. No. 6,376,770, filed on Feb. 28, 2000, the contents of all of which are incorporated herein by reference in their entirety.

FIELD OF APPLICATION

The present invention relates to electrical distribution systems and is particularly directed to the field of distribution systems for effecting the distribution and connection of electrical power or data such as telephone or computer network signals in commercial buildings, homes or cottages.

BACKGROUND OF THE INVENTION

In commercial and residential buildings, electrical boxes are used to house outlets that distribute power, switches that control lighting and virtually any type of receptacle that carries electrical signals. These electrical boxes are usually installed during construction of the buildings before walls or panels are secured to the joists and studs. Rectangular openings are cut out from the wall panels to allow access to the installed electrical boxes.

An example of this type of prior art electrical box is shown in U.S. Pat. No. 4,165,443 by Figart et. al. issued Aug. 21, 1979, in which an electrical box system for mounting modular switch and receptacle units to a wall is disclosed. The receptacle units have special shapes with elongated terminals protruding from the backside, which fit into complementary openings within the electrical box. Power and distribution cables connect directly to access openings in the box, and are routed to the receptacle unit terminals through a bus plate array. The electrical box is mounted to a wall stud using a mounting bracket having mounting slots and lips that correspond to mounting slots and lips in the electrical box. Once the mounting bracket is secured to a wall stud, the electrical box can slide into its corresponding slots and lips. This system is disadvantageous in that there is no method to secure the electrical box to any structure other than a stud within a wall. This is not always acceptable since the placement of an electrical box is frequently determined by function or desire rather than the location of existing wall studs. Another disadvantage is the necessity for screws and tools to fix the mounting bracket to the stud, which reduces the overall ease of installation of the electrical box.

The limited placement ability of the electrical box is addressed in U.S. Pat. No. 5,500,487 by Leon issued Mar. 19, 1996 and U.S. Pat. No. 4,485,282 by Lee issued Nov. 27, 1984. Leon discloses a simple electrical box having contacts inside the box for making electrical connection to removable switch or receptacle units. The switch and receptacle units have special shapes that allow them to be inserted within the box that avoids incorrect electrical connections. This electrical box has the capability of being installed at any position in a wall, but requires screws and tools to fasten its securing tabs to the wall.

Similar to Leon, Lee discloses a base, similar to an electrical box, with niches that can accommodate removable switch or receptacle units. A mechanical system ensures that the units can be locked to the base to prevent unwanted removal of the switch or receptacle units. This system also requires the base to be secured to a wall with screws.

Both Leon and Lee overcome the limited placement problem of Figart et. al., but still require screws and tools in order to secure the respective product into a wall, which is time-consuming and cumbersome. Furthermore, an electrical box secured to a wall by screws can become unstable after installation.

U.S. Pat. No. 4,500,746 by Meehan issued Feb. 19, 1985 shows a self-contained electrical box that can either be a receptacle or switch. The power supply wires are pressed into the back of the receptacle without the need for stripping off the insulation from the wires to make electrical contact. A screw engages a pawl in the back of the unit that eventually sandwiches the wall between the pawl and an external securing tab of the electrical box. This particular feature is an improvement over the inventions of Leon and Lee in that the electrical box remains more stable and secure in the wall. Installation of this electrical box is still somewhat time consuming since a tool is required for setting the screw.

U.S. Pat. No. 4,215,787 by Moran, Jr. et. al. issued Aug. 5, 1980 discloses an electrical box with moulded wedge-shaped retaining stunts for easy insertion and securing of the electrical box at any position in a wall. The electrical box can accommodate any receptacle unit. As with Leon, Lee and Meehan, this electrical box does not have to be fixed to a stud. Additionally, the retaining stunts can ensure that the electrical box remains stable within the wall. The distinctive feature of this electrical box over the previous references is that no screws or tools are required for its installation within the wall. However, the stability of the electrical box depends on the precise opening in the wall. The opening must be complementary in size and configuration to the open front side of the box. A slightly enlarged opening can result in an electrical box that is unstable in either the vertical or horizontal directions within the wall. It is even possible for the electrical box to be pulled out from the opening in the wall during normal use as a power outlet if the opening is too wide. Therefore, this electrical box has a very low tolerance for variations in wall opening sizes, especially in the vertical direction, and is difficult to securely lock into place.

The system shown in U.S. Pat. No. 4,847,444 by Holland, issued Jul. 11, 1989 includes an electrical box holder which can snap into an opening cut out from a wall. The electrical box, affixed with any receptacle unit, can be firmly secured by the holder within the wall. This is achieved by sandwiching a wall edge between outer lips and inner edges of the holder. Spacers can be attached to the inner edges of the holder to reduce the spacing between it and the outer lip in order to accommodate thinner walls. Although the holder is more stable than the electrical box of Moran, Jr. et. al., screws and tools are required to secure the electrical box to the holder.

U.S. Pat. No. 4,226,393 by Rardin et. al., issued Oct. 7, 1980 discloses an anchoring device for securing an electrical box within a wall. The electrical box snaps into the anchoring device that comprises of wedge shaped resilient fingers for allowing easy entry into an opening cut out from a wall. Clamps are secured to the anchor device via screws such that the wall is sandwiched between the fingers and clamps. Even though the electrical box is quickly secured into the anchoring device, the anchoring device itself will not remain secure within the wall until the clamps are screwed to the anchoring device to lock the anchoring device to the wall. This method of installation is still rather cumbersome and time consuming.

There is clearly a need for a quick connecting electrical box system in which an electrical box can be firmly and reliably secured within an opening in a wall without the use of any screws and tools.

SUMMARY OF THE INVENTION

It is an object of the invention to provide a quick connecting universal electrical box mounting system including a mounting frame, for the installation of electrical sockets, switches or any electronic component that is typically installed into a wall for users to access, and can be secured within an opening in a wall without the need of any screws or tools.

The mounting frame preferably has wall engaging means attached to the top and bottom sides of the frame for retaining the frame in a wall opening of appropriate size. The electrical box is preferably shaped and constructed to closely fit the mounting frame such that the electrical box can be inserted into the mounting frame. Retaining means on the electrical box co-operate with interlocking means in the mounting frame. The retaining means are preferably retaining studs formed on flexible side panels of the electrical box and the interlocking means are preferably openings formed in the side walls of the frame for receiving the retaining studs. The electrical box is preferably of standard size to accommodate virtually all types of electrical sockets or switches.

Once the mounting frame is inserted into an opening in a wall, the electrical box can be fully inserted into the mounting frame. The action of inserting the electrical box into the mounting frame preferably forces the wall engaging means into a wall engaging position to lock the mounting frame in the wall opening.

In the preferred embodiment, the retaining studs on the flexible side panels of the preferred electrical box then engage corresponding openings in the preferred mounting frame to secure the electrical box within the mounting frame. No tools are required to secure the mounting frame and electrical box within the wall other than those required to create the wall opening. This system allows for a quick and efficient installation process.

BRIEF DESCRIPTION OF THE DRAWINGS

Exemplary embodiments of the invention will now be further described with references to the drawings in which same reference numerals designate similar parts throughout the Figures, and wherein:

FIG. 7 shows a front elevational view of the electrical box of FIG. 1;

FIG. 8 shows a cross sectional view of the electrical box of FIGS. 2 and 7 taken along line A-A;

FIG. 13 shows a cross sectional view of the electrical box of FIG. 12 taken along line B-B;

FIG. 14 shows a cross sectional view of the electrical box of FIG. 12 taken along line C-C;

FIG. 18 shows the pair of electrical boxes of FIG. 17 after insertion of the splines of FIG. 15;

FIG. 19 shows a side elevational view of the electrical box mounting frame in the resting position;

FIG. 20 shows a side elevational view of the electrical box mounting frame of FIG. 19 in the retaining position;

FIG. 35 shows an orthogonal view of the male connector module of FIG. 32, illustrating the bottom side;

FIG. 36 is an exploded view of a female plug unit in accordance with the invention;

FIG. 37 is an exploded view of a male plug unit in accordance with the invention;

FIG. 38 shows an orthogonal view of the assembled male and female plug units of FIGS. 36 and 37;

FIG. 42 shows an orthogonal view of male and female rectangular prongs with wire trap in accordance with the invention;

FIG. 43 shows an orthogonal view of male and female round prongs with wire trap in accordance with the invention;

FIG. 49 shows an orthogonal view of male and female rectangular prongs with wire trap in accordance with an alternate embodiment of the invention;

FIG. 50 shows an orthogonal view of male and female round prongs with wire trap in accordance with an alternate embodiment of the invention;

DETAILED DESCRIPTION OF THE INVENTION

Figure 1:
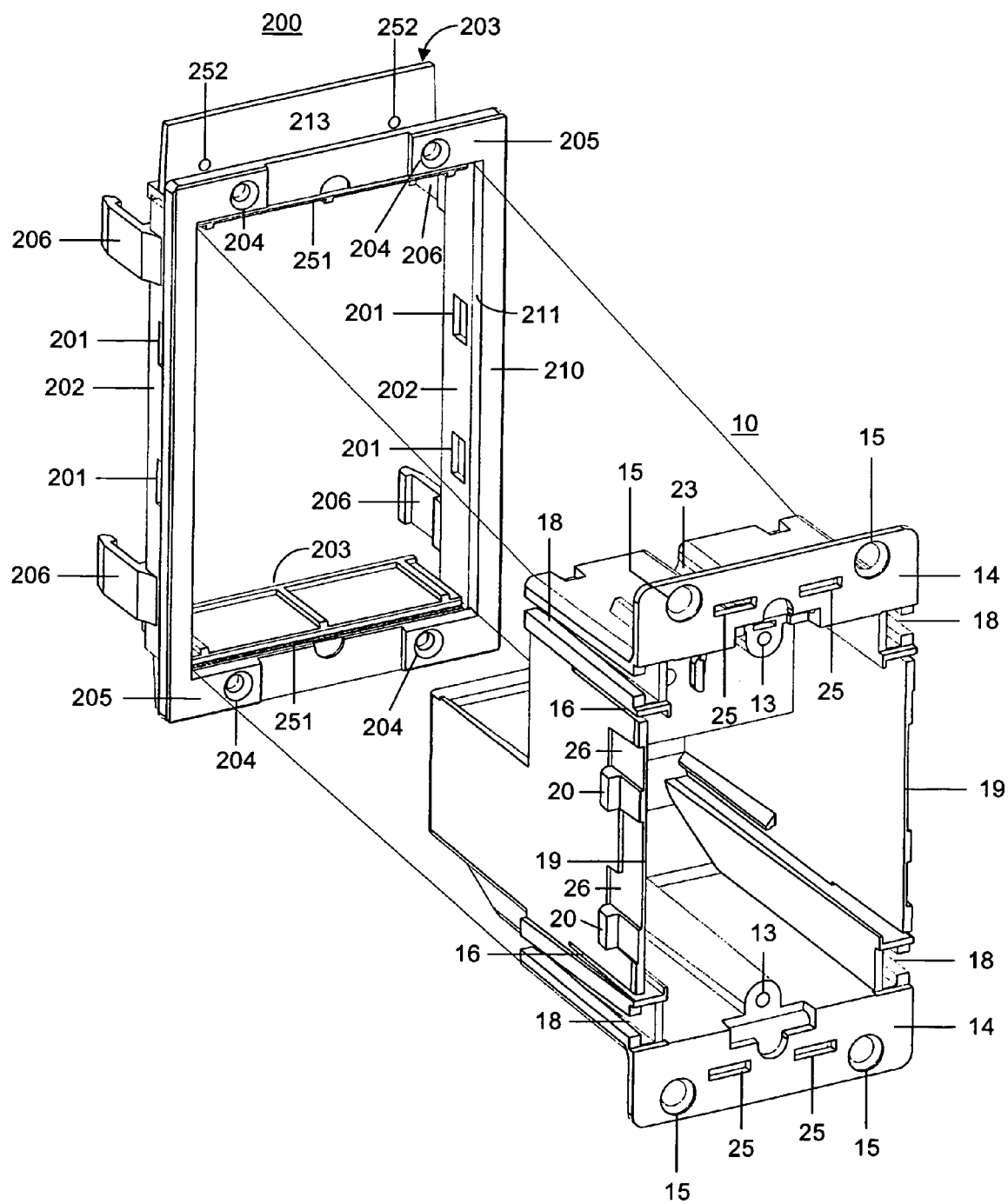
FIG. 1 shows an orthogonal exploded view of the preferred electrical box and mounting frame combination in accordance with the invention.
Figure 2:
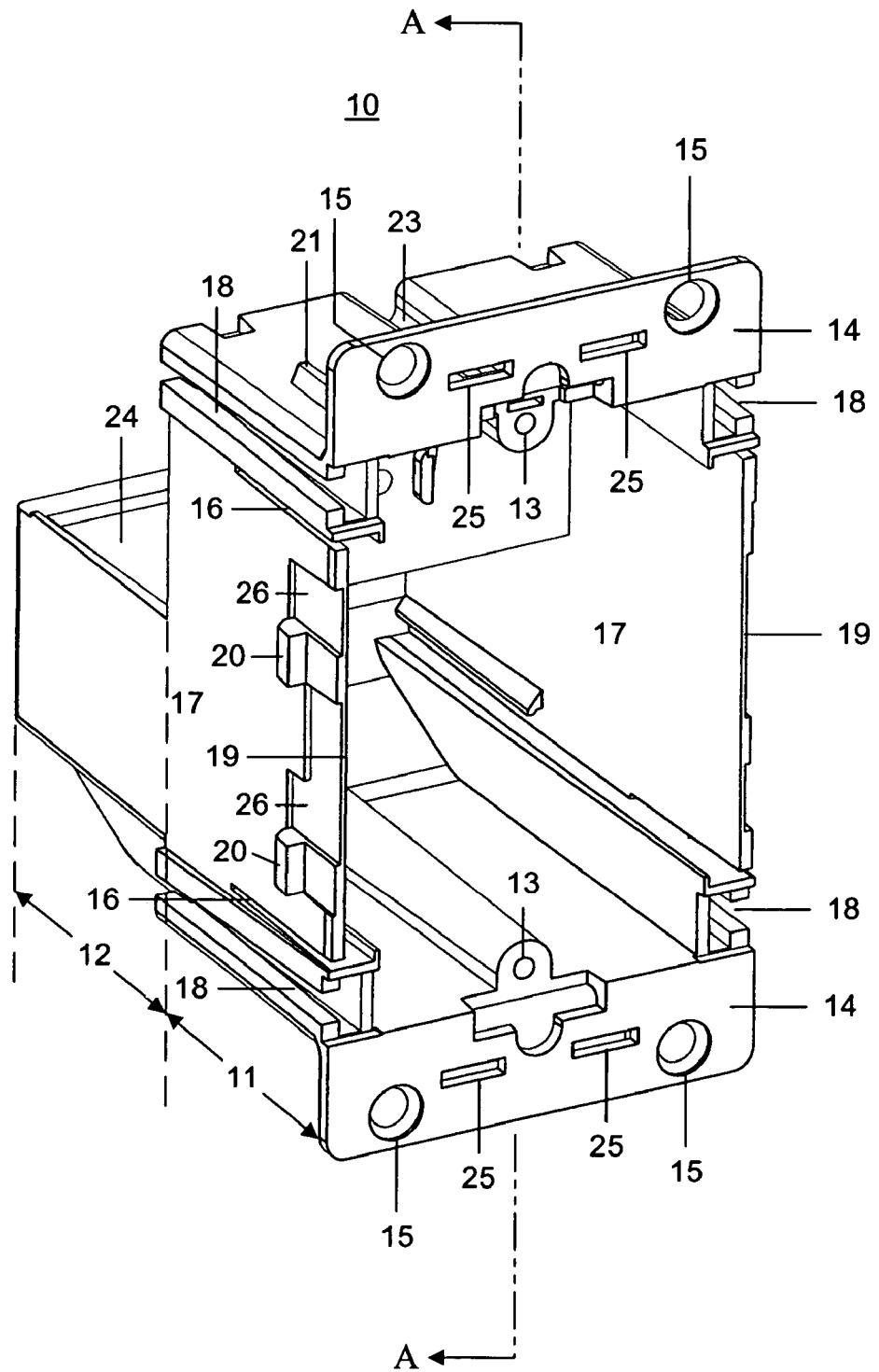
FIG. 2 shows an orthogonal view of the electrical box of FIG. 1, illustrating the front, top and left sides.
Figure 3:
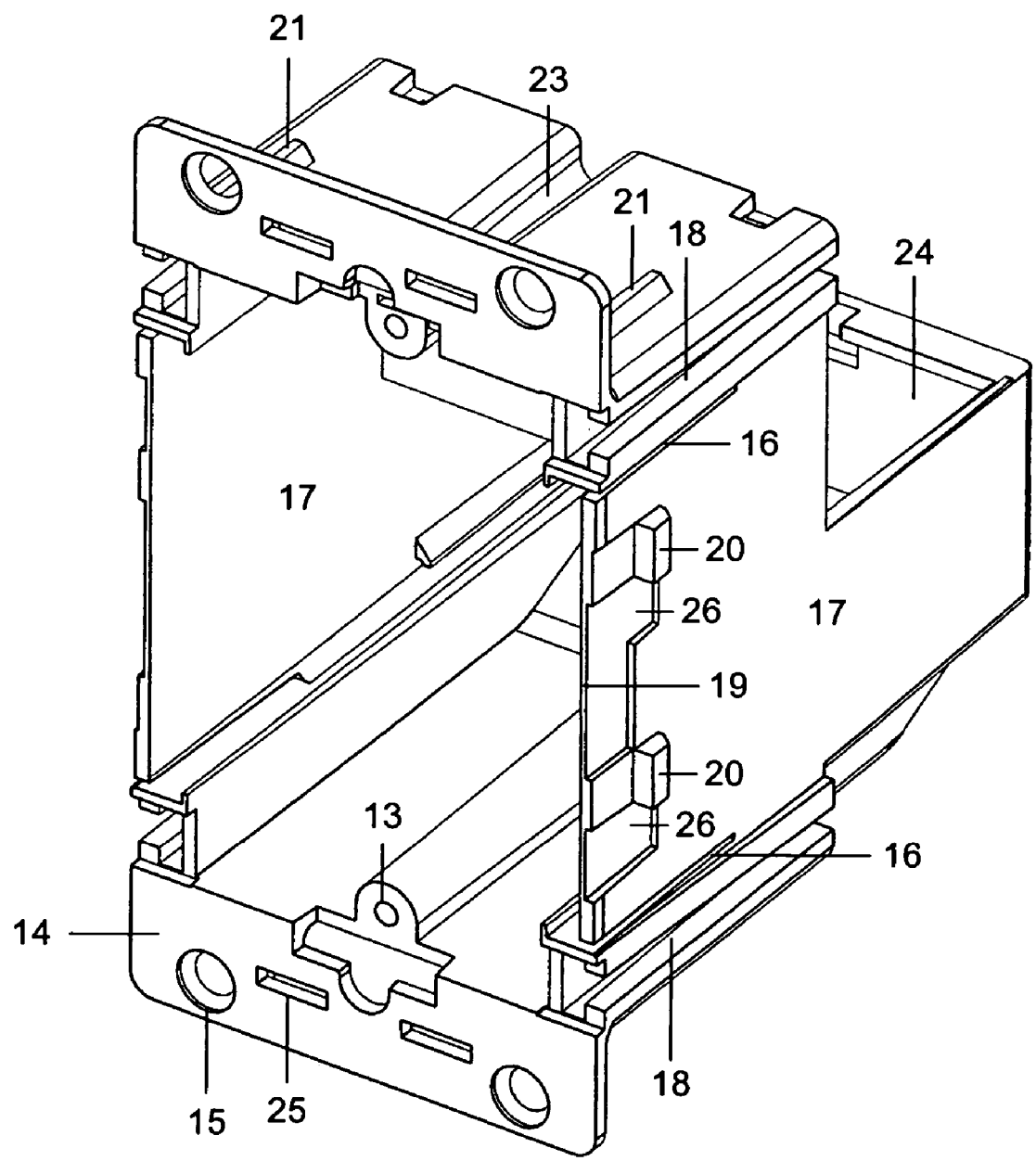
FIG. 3 shows an orthogonal view of the electrical box of FIG. 1, illustrating the front, top and right sides.
Figure 4:
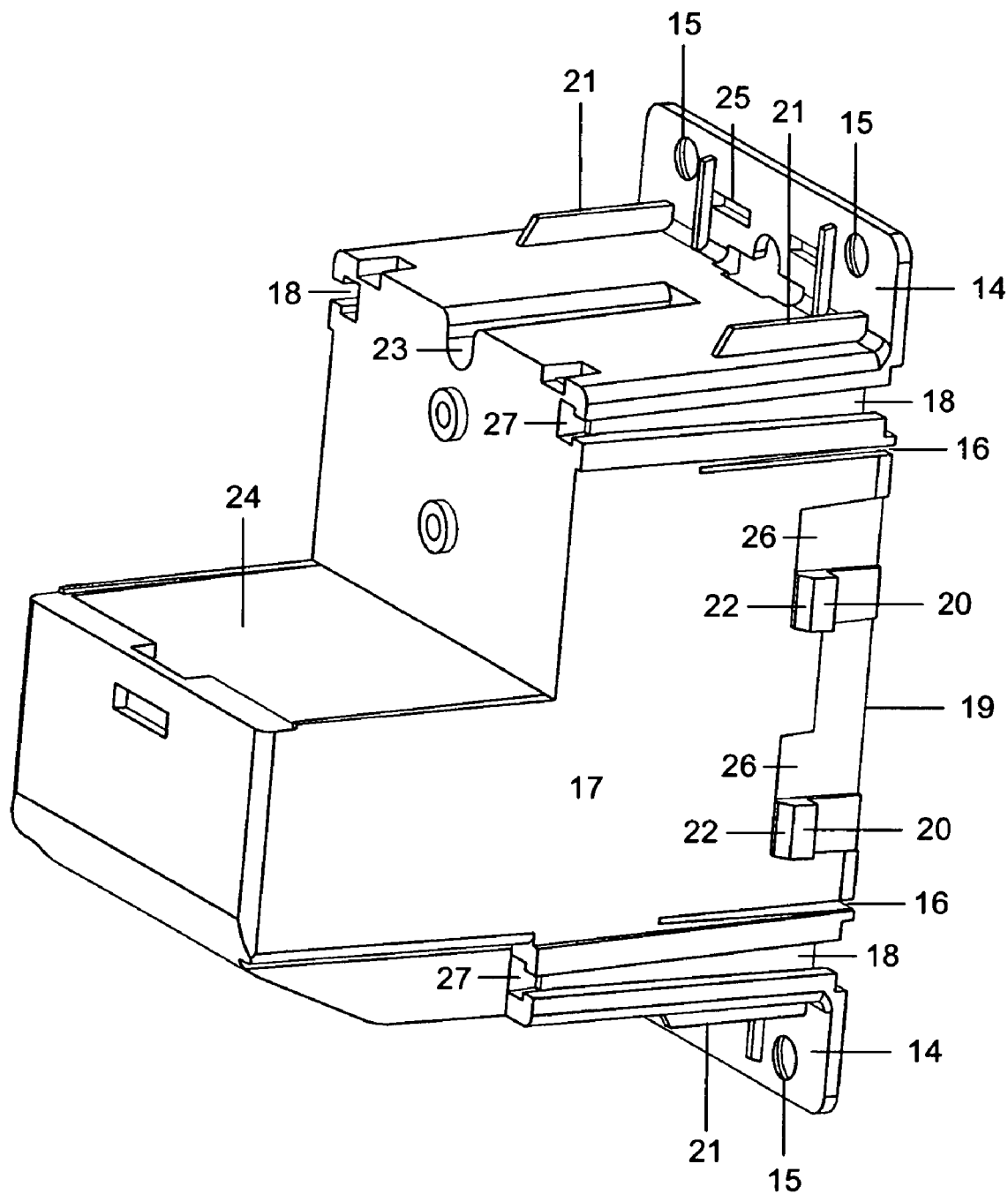
FIG. 4 shows an orthogonal view of the electrical box of FIG. 1, illustrating the back, top and left sides.
Figure 5:
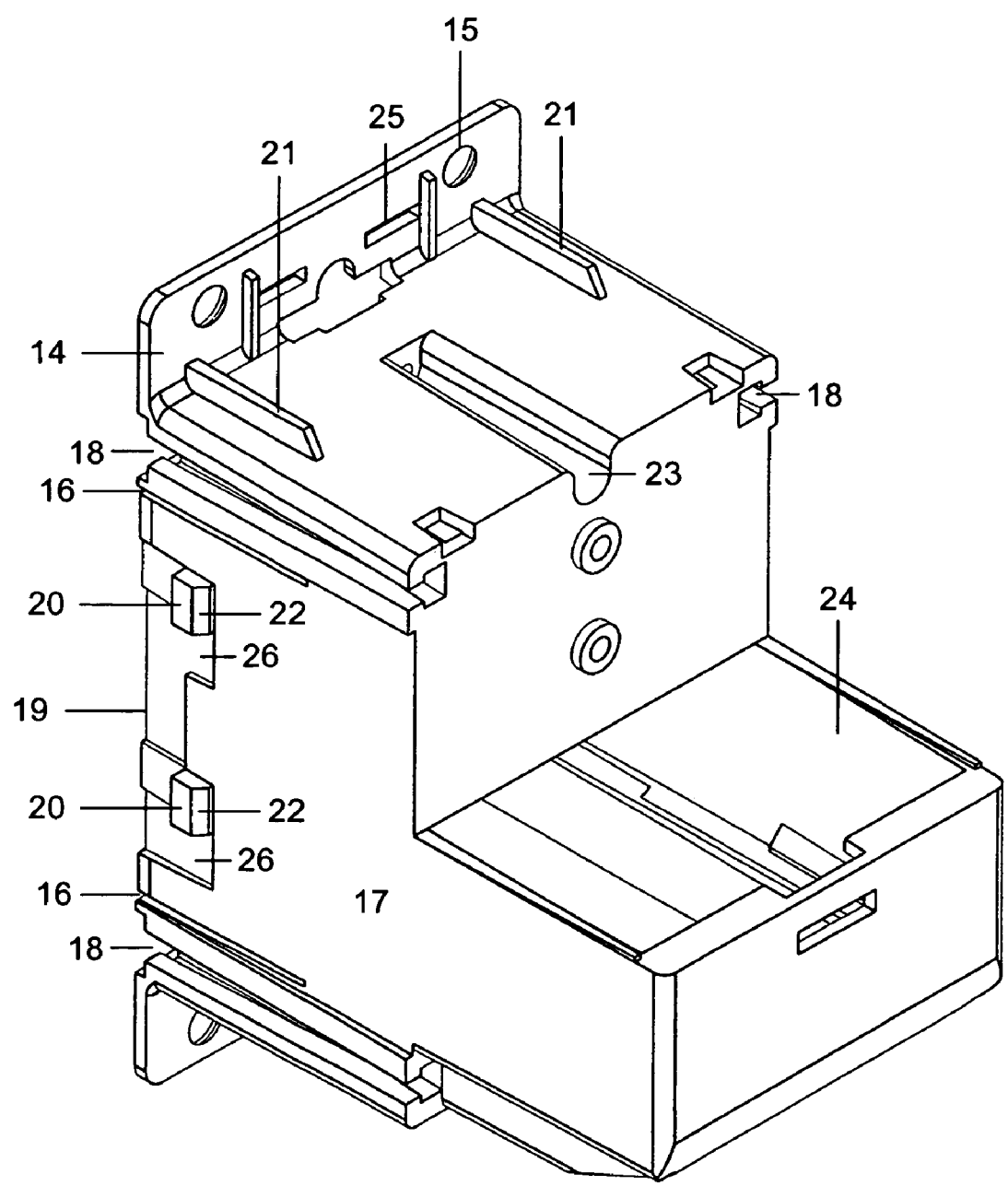
FIG. 5 shows an orthogonal view of the electrical box of FIG. 1, illustrating the back, top and right sides.
Figure 6:
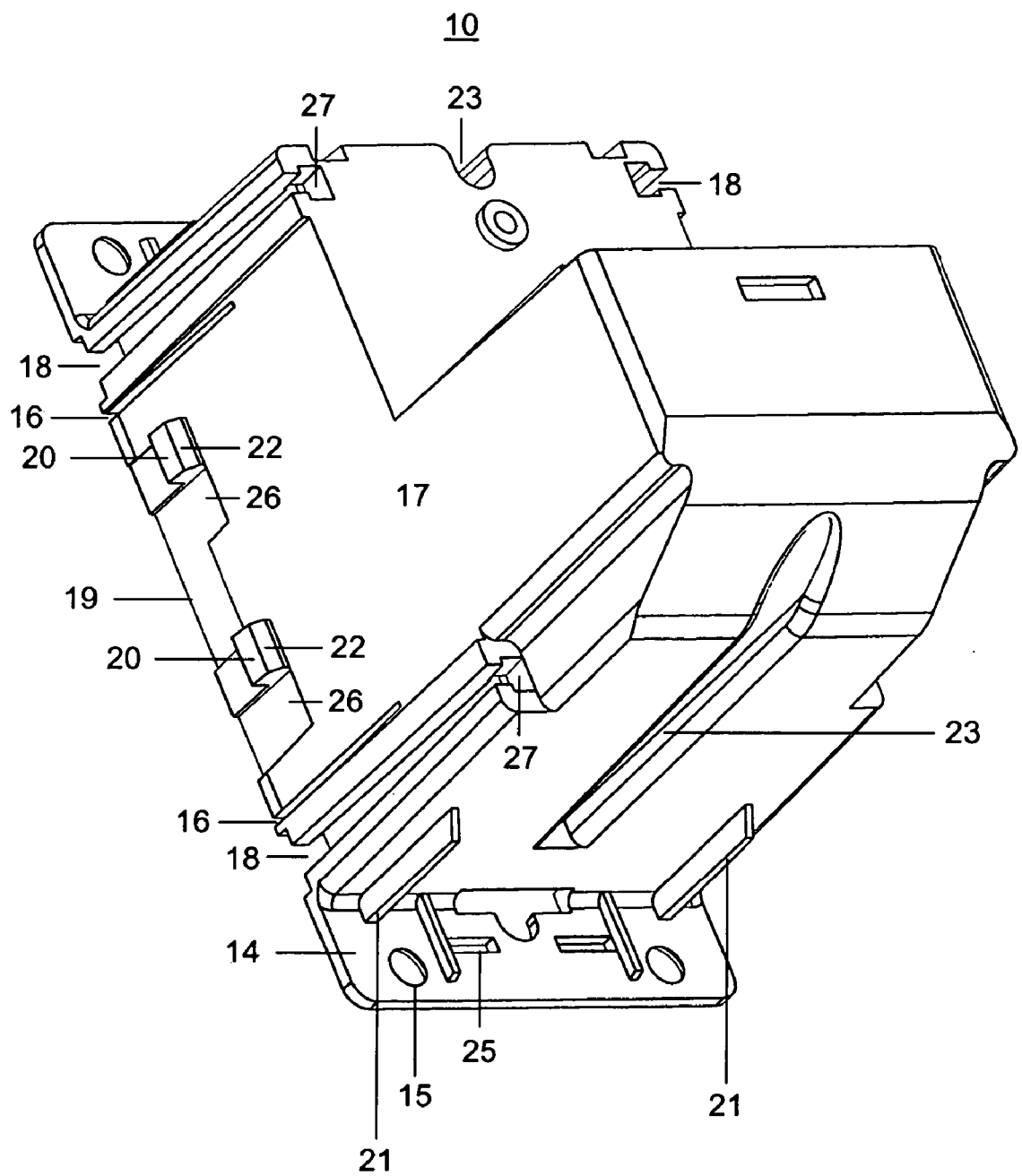
FIG. 6 shows an orthogonal view of the electrical box of FIG. 1, illustrating the back, bottom and right sides.
Figure 9:
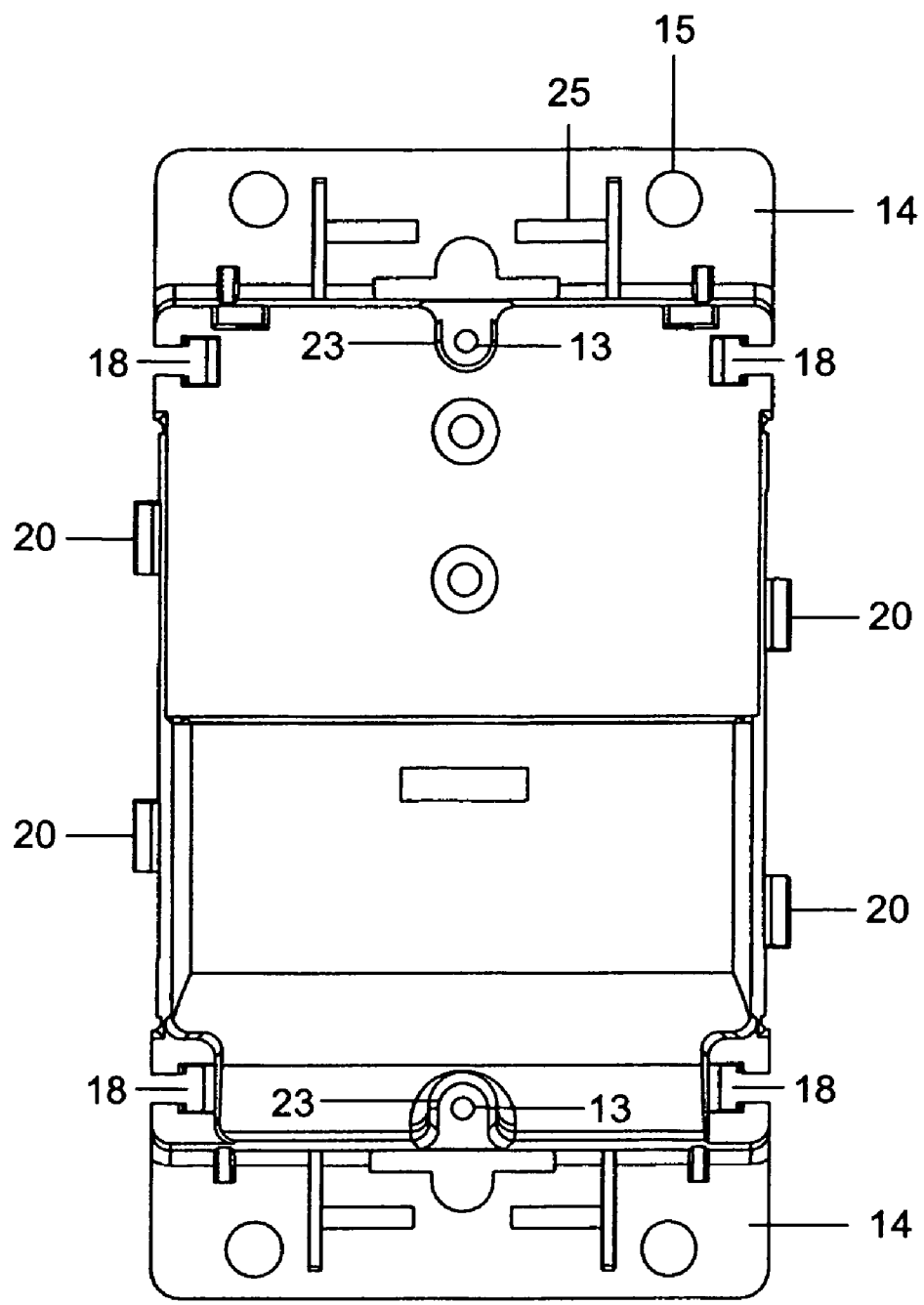
FIG. 9 shows a rear elevational view of the electrical box of FIG. 1.
Figure 10:
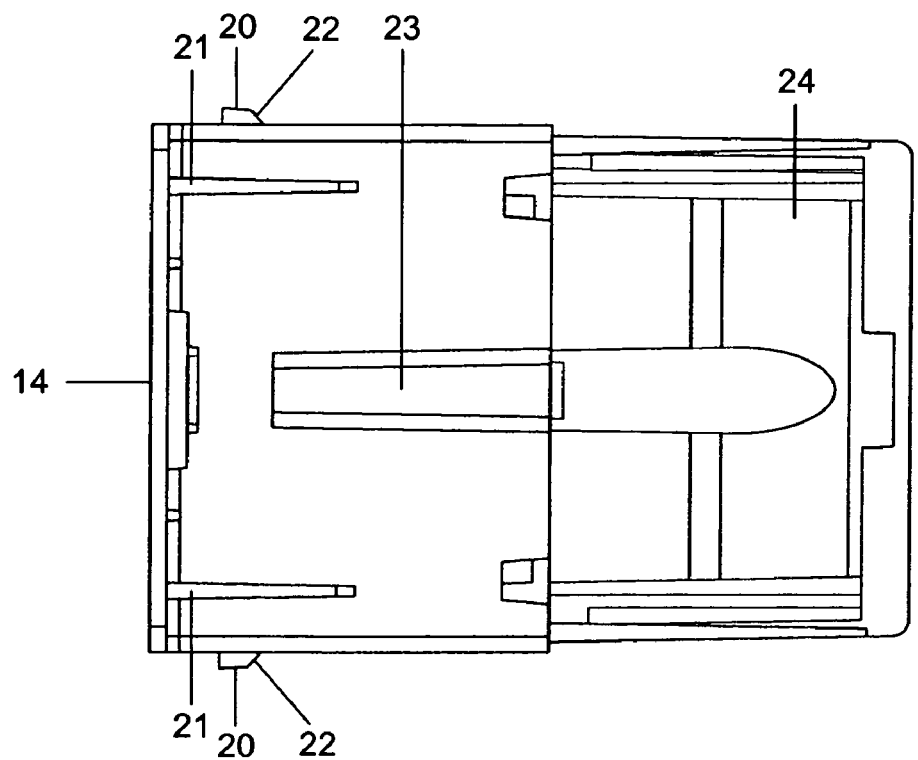
FIG. 10 shows a top plan view of the electrical box of FIG. 1.
Figure 11:
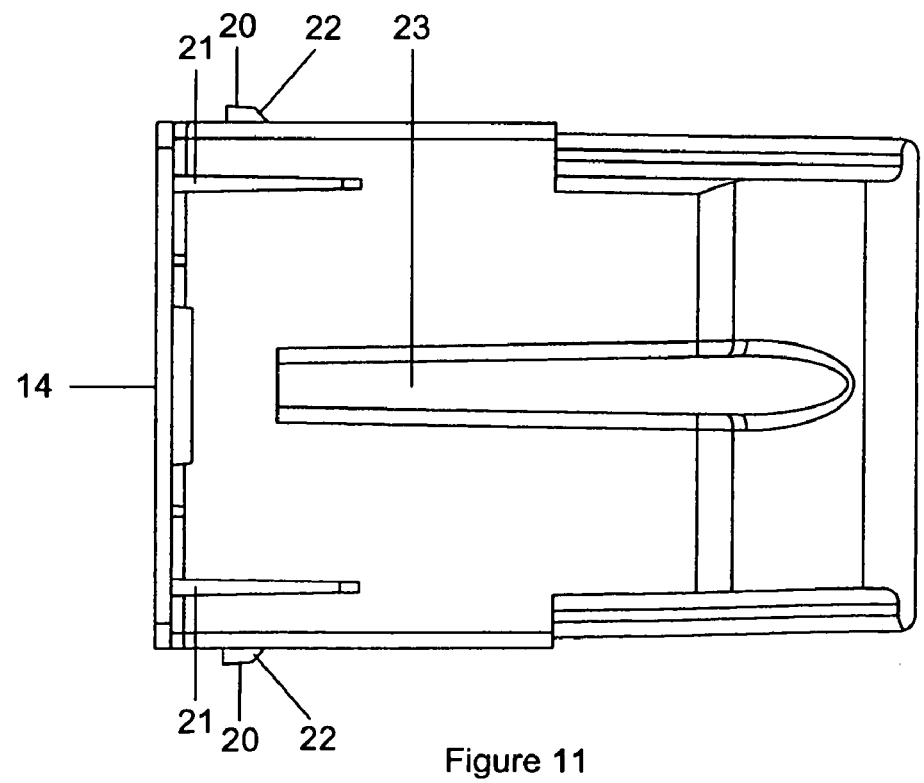
FIG. 11 shows a bottom plan view of the electrical box of FIG. 1.

In the preferred embodiment, the electrical box and mounting frame combination as shown in FIG. 1 includes an electrical box 10 and a mounting frame 200 for insertion into a wall opening as will be further described in detail below. The mounting frame 200 includes wall engaging means such as securing flaps 203 which lock the frame in a wall panel or wall board in their retaining position as shown in FIG. 1. The flaps 203 are automatically forced into and maintained in the retaining position by the electrical box in the assembled condition of the electrical box and frame combination.

The electrical box 10 shown in FIGS. 1 to 6 consists of a main rectangular enclosure 11 for the installation of an electrical socket, switch or other electrical connection or outlet, or a voice, data, video, or audio connection, in the following generally referred to as a "functional insert". A connector box 12 is attached to the rear of the enclosure 11 for installation of a fixture receptacle into receptacle housing 24. Screw receiving bores 13 are provided in the enclosure 11 for the installation of a functional insert. Screw grooves 23 are provided to accommodate screws of various lengths that may be inserted into screw receiving bores 13. Screw apertures 15 in electrical box retaining tabs 14 can be used for securing electrical box 10 to a wall with standard fitting screws, if desired. Each side wall 17 of enclosure 11 has a pair of spaced apart parallel slits 16 that extend perpendicularly from the front face of the enclosure to a substantial depth, preferably half the total depth, most preferably three quarters of the depth of the enclosure 11. Slits 16 create gaps in the side walls 17 thereby forming flexible side panels 19 for limited deflection in a direction perpendicular to the plane of side wall 17 and at a front end of the panel. Rectangular retaining studs 20 protruding from the outer surface of the flexible side panels 19, serve to secure the electrical box 10 to the mounting frame 200 in the assembled condition as will be discussed in more detail below. Formed in the electrical box retaining tabs 14 are horizontal slots 25 that allow an aesthetic cover 2, with complementing protrusions, to be placed over the face of electrical box 10 (see FIG. 30).

Figure 23:
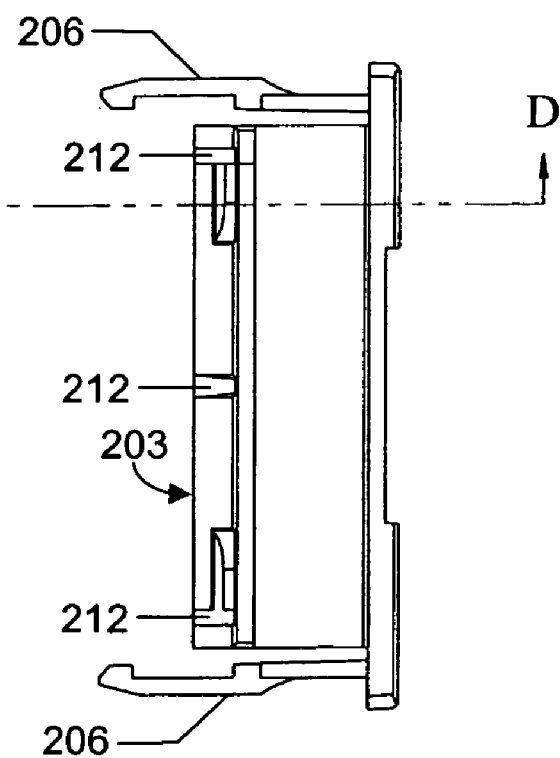
FIG. 23 is a top plan view of the electrical box mounting frame of FIG. 20;.
Figures 22, 24:
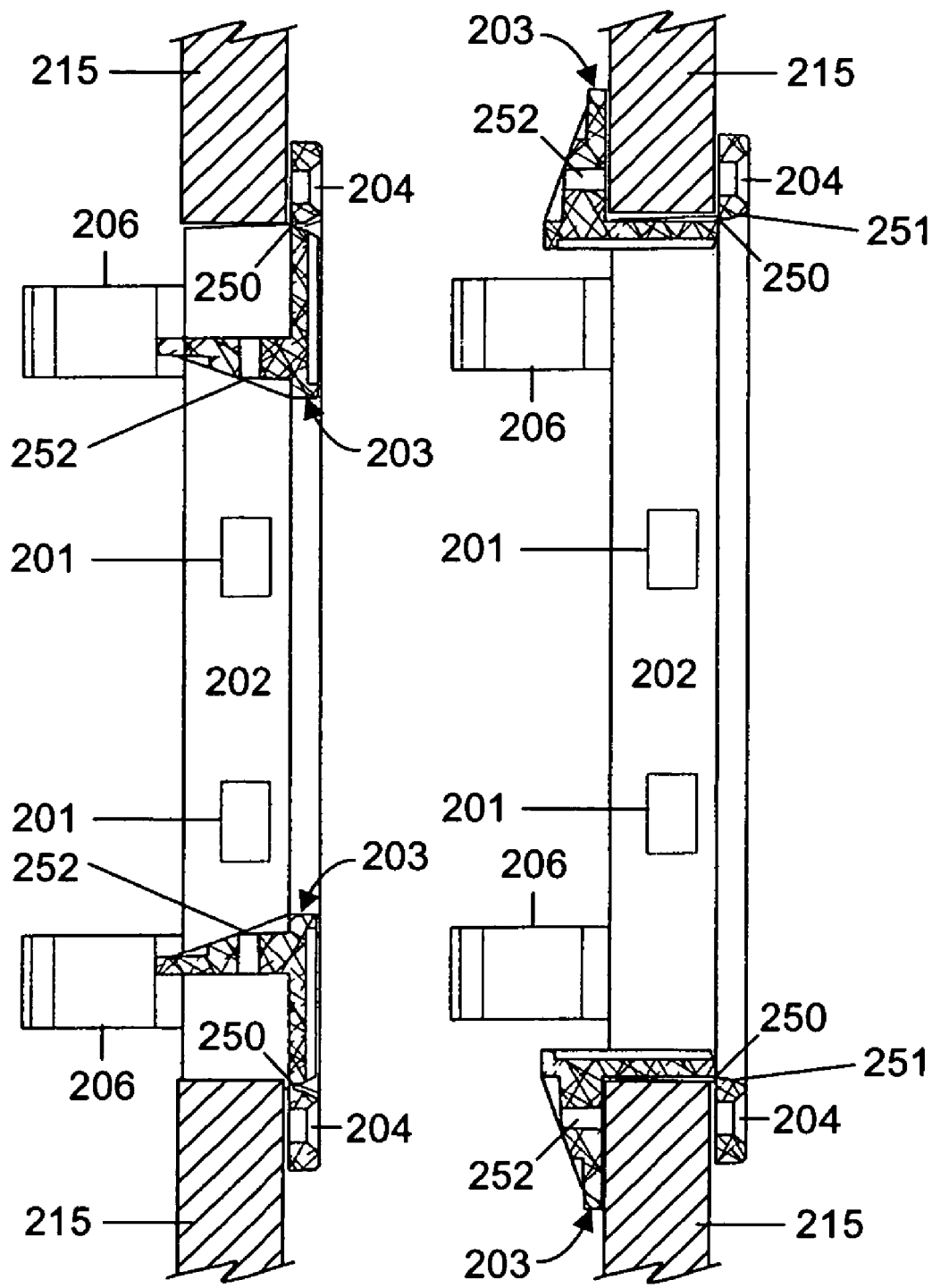
FIG. 22 is a cross sectional view of the electrical box mounting frame of FIG. 21 taken along line D-D.
FIG. 24 is a cross sectional view of the electrical box mounting frame of FIG. 23 taken along line D-D.

In FIG. 1, electrical box mounting frame 200 is rectangular in shape to accommodate electrical box 10. The frame 200 includes a rectangular mounting flange 210 for resting against a wall surface (not shown) in an installed condition of the frame. The flange 210 has a central, rectangular opening 211 for insertion of the electrical box 10. Side walls 202 of the frame 200 extend perpendicularly from an inward edge of the mounting flange 210 to engage the edges of a wall opening (not shown). The flange 210 includes top and bottom retaining tabs 205. Side walls 202 of mounting frame 200 have openings 201 for engagement by rectangular retaining studs 20 that protrude from the flexible side panels 19 on the electrical box 10. The positions of the openings 201 in both frame side walls 202 correspond to the locations of the rectangular retaining studs 20. The frame also includes a pair of securing flaps 203, which are shown in FIGS. 22 and 24, in the resting and retaining positions respectively. Securing flaps 203 are respectively connected to the top and bottom inward edges 251 of mounting flange 210 via a swivel connection, in this embodiment a living hinge 250. Each securing flap 203 consists of a pair of rectangular panels connected together to form a right-angled member. One rectangular panel has two screw apertures 252. Screw apertures 204 in frame retaining tabs 205 coincide with screw apertures 15 in the retaining tabs 14 of the electrical box 10 and screw apertures 252 in the securing flap 203, when the securing flaps are in the fully engaged position as shown in FIG. 24. Securing flap 203 further includes reinforcing webs 212 (see FIGS. 20 and 23) for reinforcement of the angled connection of the two flap panels.

Following is a description of the use of the electrical box support frame 200 with the electrical box 10. Reference should be made to FIGS. 1 and 19 to 24.

The inner edge of the flange 210 of the mounting frame 200 can be used as a template to draw a rectangle on a wall panel, such as dry wall, to indicate the position of the electrical box 10. Once the rectangle is cut out from the wall, the support frame 200 is inserted into the wall. The electrical box 10 can then be inserted into the support frame 200. As the electrical box 10 is pushed into the support frame 200, fins 21 on the top and bottom walls of the electrical box 10 (see FIGS. 4 and 6) engage the hinged securing flaps 203 of the support frame 200. This action forces the securing flaps 203 to rotate about their respective hinges 250 until the right angled panel 213 of securing flap 203 is spaced apart and parallel to the retaining tab 205 of the mounting flange 210. Now the dry wall 215 is sandwiched between the frame retaining tabs 205 and the securing flaps 203 (see FIG. 24). The size of the panels 213 of the securing flaps 203, and the force applied by the securing flaps 203 to the top and bottom edges of the wall opening are sufficient to reliably maintain the support frame 200 secured in the wall opening against tearing out. The side walls 202 maintain the orientation of the frame 200 in the wall opening. Removal of the mounting frame 200 from the wall opening is not possible without removal of the electrical box 10 or tearing out significant portions of the wall panel.

The same action of pushing the electrical box 10 into the support frame 200 will bring the rectangular retaining studs 20 into registration with the support frame openings 201. The retaining studs 20 snap into the openings 201 and lock the electrical box 10 within the mounting frame 200. The rectangular retaining studs 20 preferably have bevelled forward edges 22 to allow easier insertion of the electrical box 10 into the support frame 200. The electrical box 10 is now firmly secured to the support frame 200, which is firmly secured to the dry wall.

Figure 29:
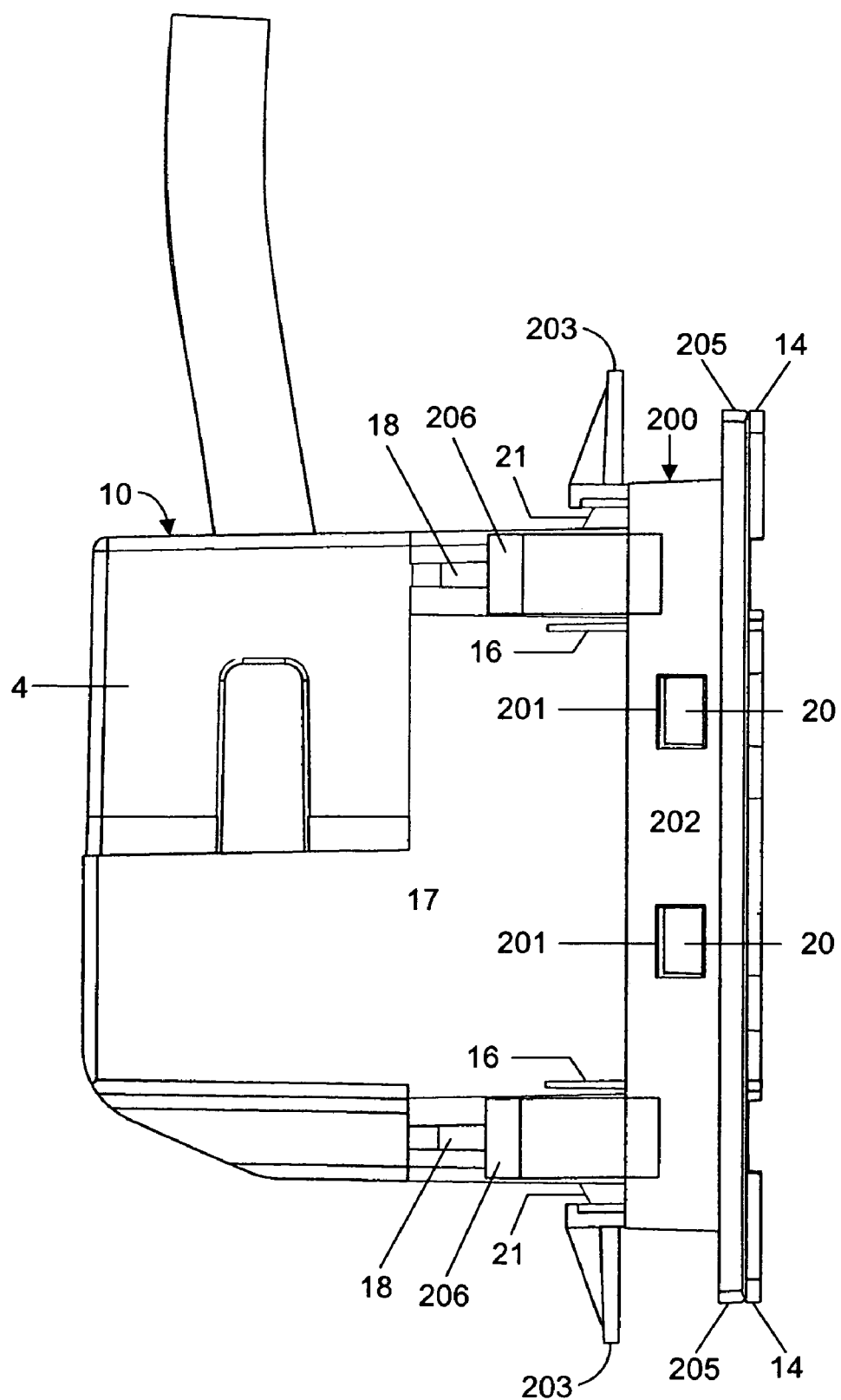
FIG. 29 shows a left side elevational view of the electrical box of FIG. 1 fully engaged in the mounting frame.
Figure 30:
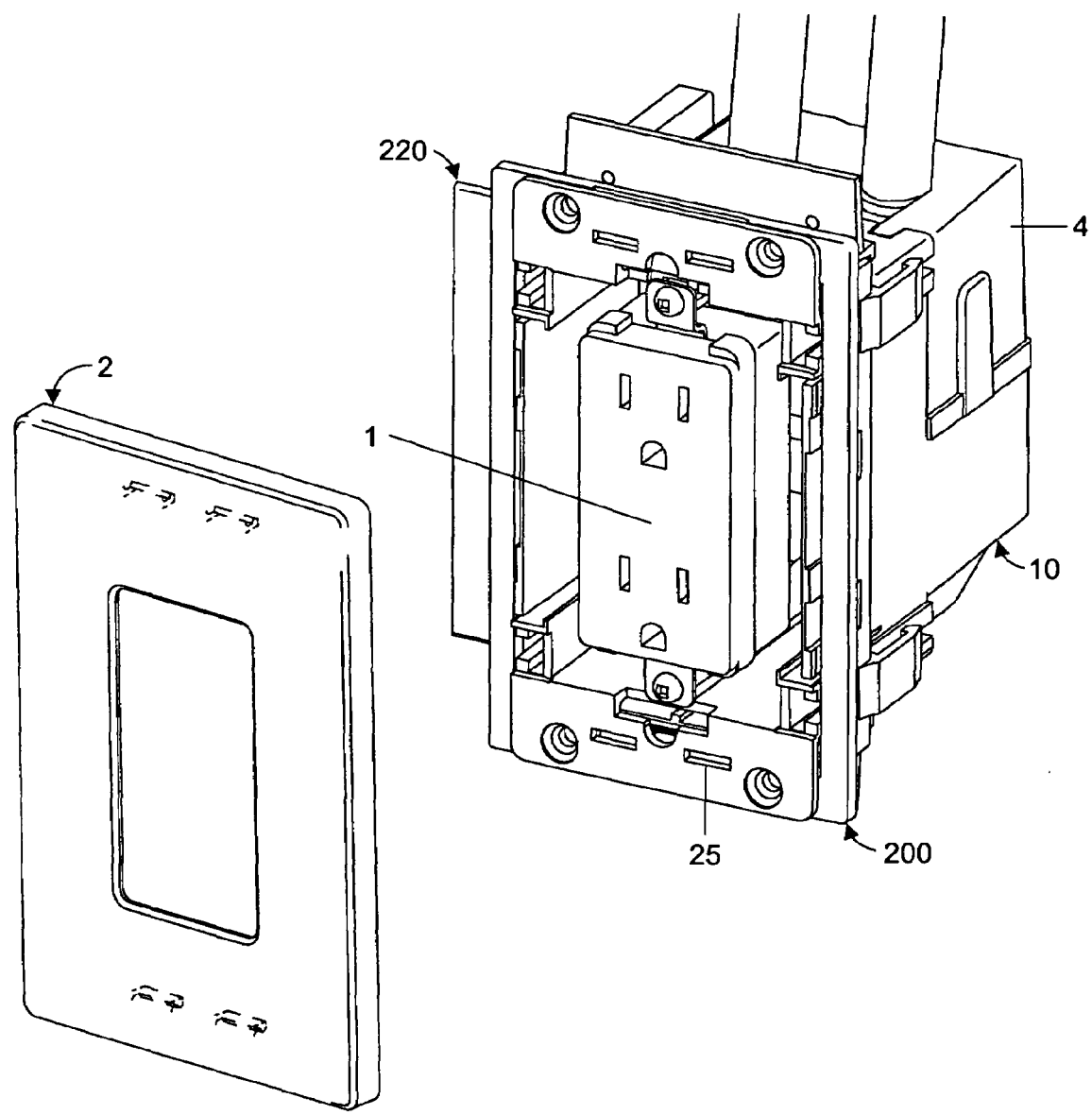
FIG. 30 shows an orthogonal view of all components of a preferred electrical box system in accordance with the invention.

Although not required for a secure installation of the electrical box 10 and frame 200 combination into a wall opening, screws may be used to fasten the support frame 200 and electrical box 10 together via aligned screw apertures 252, 204 and 15 in the securing flaps 203, support frame 200 and electrical box 10 respectively. Tightening of the screw will draw the retaining tabs 205 and the securing flaps 203 towards each other against the dry wall, providing an additional securing force against the dry wall. FIGS. 29 and 30 show the electrical box 10 fully engaged with the mounting frame 200.

Extraction of the electrical box 10 from the wall only requires forcing the two flexible side panels 19 of the electrical box towards one another while gently pulling the electrical box out. Forcing the flexible side panels 19 together disengages the retaining studs 20 from the openings 201 in the support frame 200 to allow the electrical box 10 to be extracted.

Unless the optional fastening screws are used, installation of the support frame 200 and the electrical box 10 in the wall will not require the use of any tools, other than the tool for creating an opening in the wall. Hence the installation and removal of the electrical box, for maintenance, upgrades or repairs, can normally be done without any tools.

Figure 12:
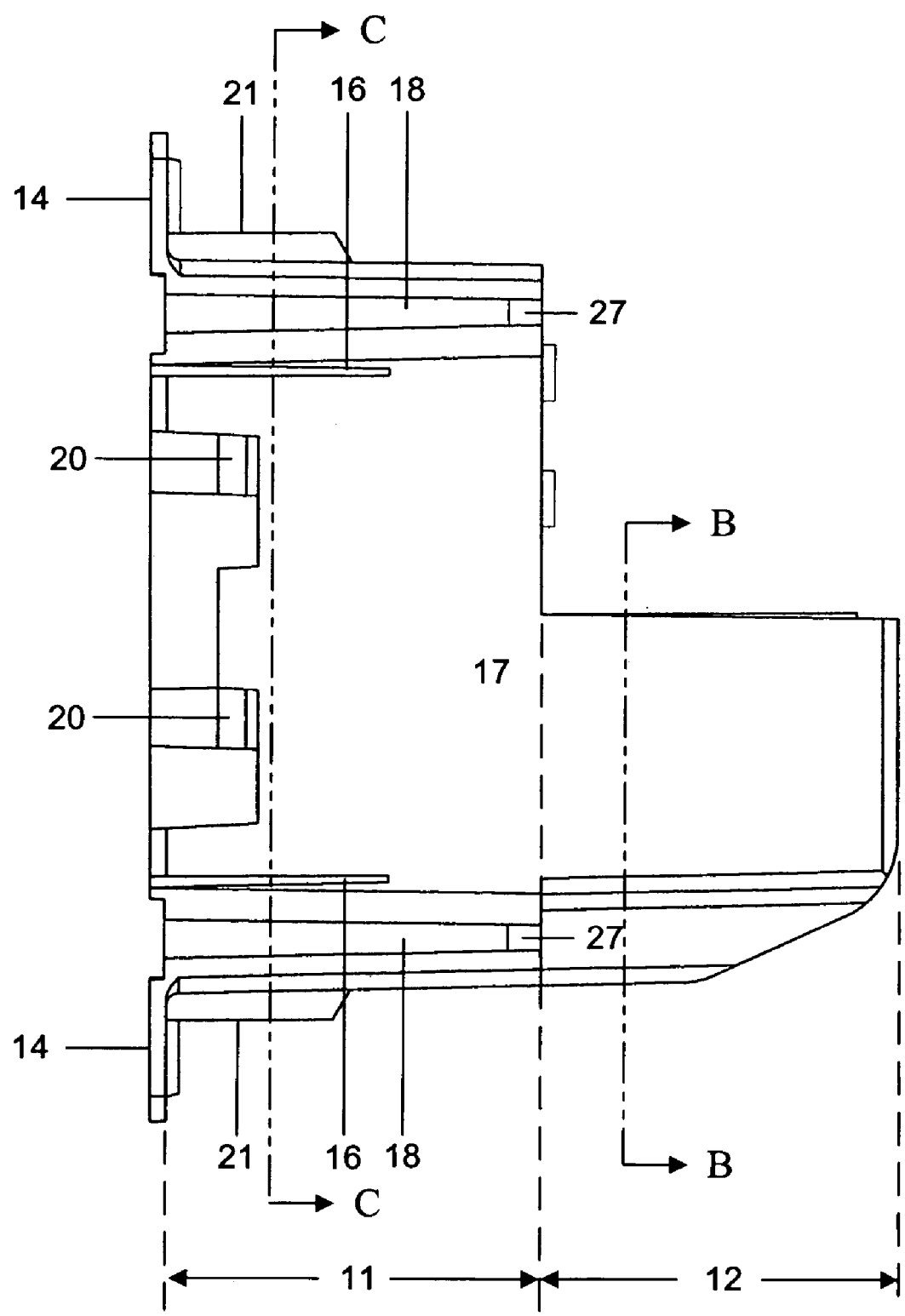
FIG. 12 is a right side view of the electrical box of FIG. 1.
Figure 16:
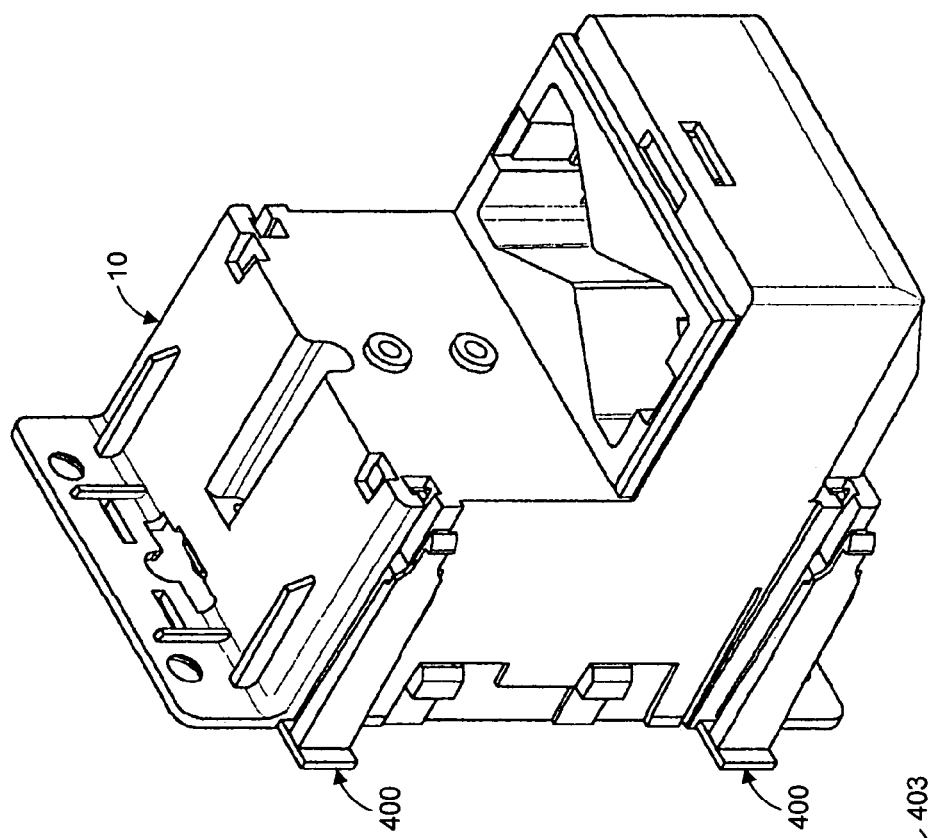
FIG. 16 shows the spline of FIG. 15 fully engaged with the electrical box of FIG. 1.
Figure 15:
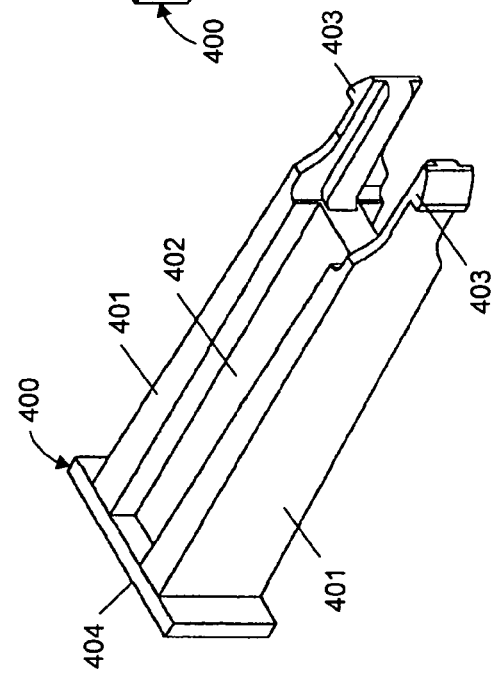
FIG. 15 shows an orthogonal view of a spline in accordance with the invention.

Frequently, electrical outlets and switches are ganged together at a selected location for easier access and use. For this setup, the electrical box 10 also has a pair of spaced apart parallel connection grooves 18 integrated into each side wall 17 which can accommodate splines 400 (FIG. 15) to allow multiple electrical boxes 10 to be adjacently coupled or ganged together in a row. The structure of connecting grooves 18 is best shown in FIGS. 12 and 14. Connecting groove 18 extends from the front to the rear of the main rectangular enclosure 11 with a shallow vertical taper, and has a cross-sectional T-shape. A recess 27 is formed in the wall of connection groove 18 near a rear portion the main enclosure box 11. FIG. 15 shows a spline 400 and FIG. 16 shows an electrical box 10 with splines 400 inserted into its connection grooves 18. Extending perpendicularly from spline flange 404 are two arms 401 connected together by bridge 402. Arms 401 extend past bridge 402 to form outwardly directed hook shaped ends 403 for engaging a recess 27 in each connecting groove 18. Spline 400 has an "I" shaped cross section where the arms 401 and the bridge 402 are formed of a corresponding size to interlock with connection grooves 18. The inside edge of arm 401 tapers towards its outside edge, and the top and bottom edges of arm 401 taper towards each other, as the arm 401 extends rearward from spline flange 404. The taper of top and bottom edges of bridge 402 follows the taper of the top and bottom edges of arm 401. The form of the spline ensures its ease of entry into a pair of adjacently placed groove structures 18, even when the adjacent groove structures 18 are not precisely aligned with each other.

Figure 17:
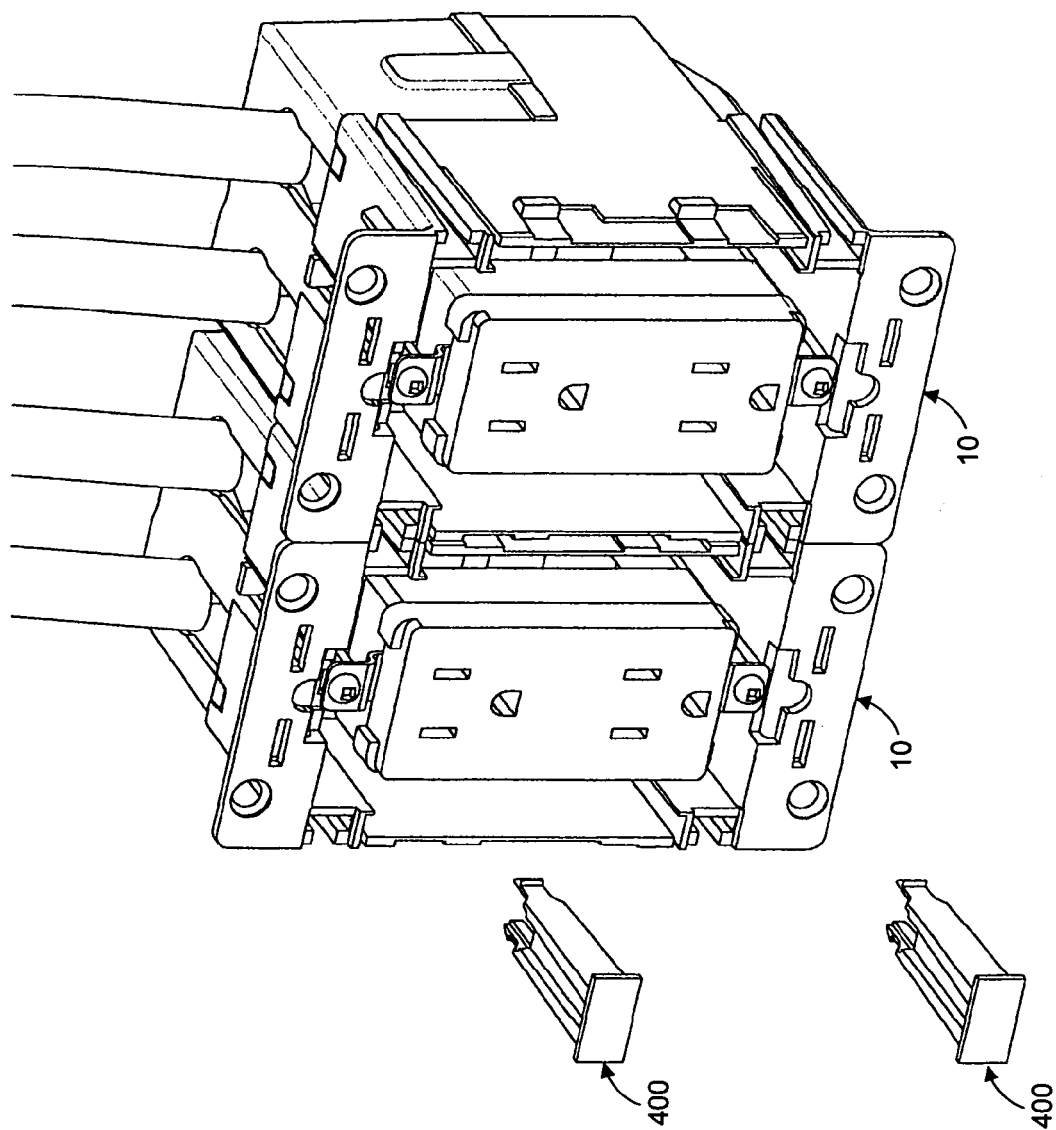
FIG. 17 shows a pair of electrical boxes before insertion of the splines of FIG. 15 in accordance with the invention.
Figure 21:
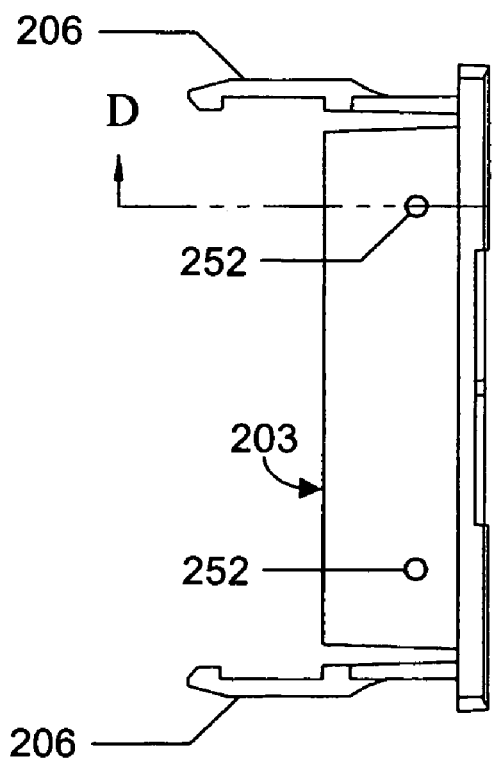
FIG. 21 is a top plan view of the electrical box mounting frame of FIG. 19.

To allow tight ganging of electrical boxes 10, the positions of the retaining studs 20 on one of the flexible side panels 19 are shifted, or offset, from the positions of the retaining studs 20 on the opposite flexible side panel 19 of the electrical box 10. Furthermore, recesses 26 (see FIG. 7) in the flexible side panels 19 allow additional electrical boxes to be closely adjacently placed without the retaining studs 20 of adjacent boxes coming into contact with each other and interfering with the ganging allowed by the connection grooves 18. FIGS. 17 and 18 show two electrical boxes 10 ganged together in a row before and after the splines 400 are inserted into the connection grooves 18 respectively. When the splines 400 are fully inserted into the connection grooves 18 and the hooked ends 403 engage recesses 27, the two electrical boxes 10 are effectively locked together as a single unit. This allows for easier insertion of both electrical boxes 10 into a correspondingly shaped mounting frame.

Figure 25:
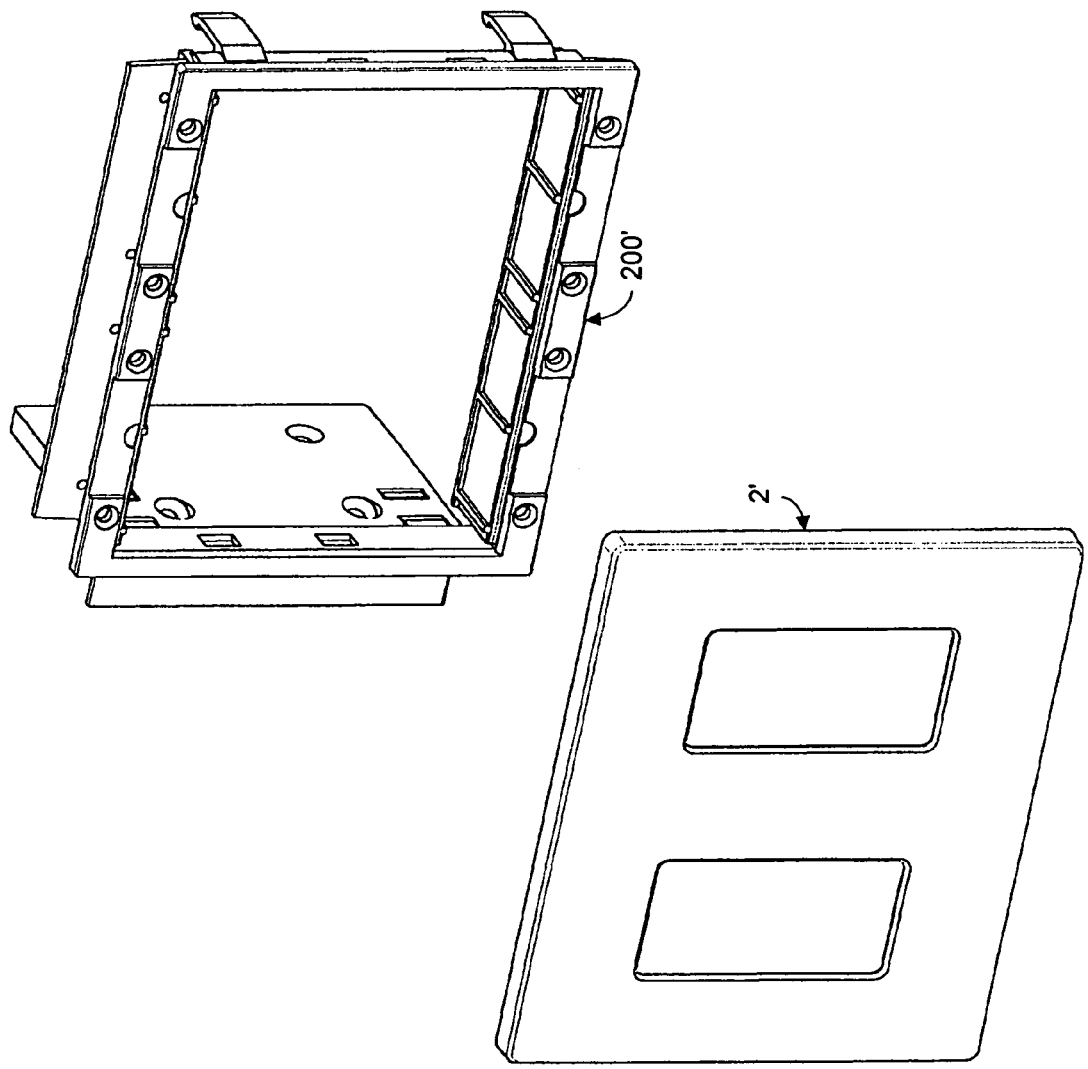
FIG. 25 shows an orthogonal view of the electrical box mounting frame for the pair of electrical boxes of FIG. 17.

In a preferred variant, the mounting frame 200 is constructed to receive two or more electrical boxes 10 in accordance with the previously mentioned ganging feature of electrical box 10. FIG. 25 shows a mounting frame 200' formed for a pair of ganged electrical boxes 10, as shown in FIGS. 17 and 18. Mounting frame 200' incorporates the same features as mounting frame 200, and functions in the same manner as mounting frame 200, to lock a ganged pair of electrical boxes within a wall opening. Of course, mounting frames 200' of a construction adapted to house more than two ganged electrical boxes are also encouraged. To accommodate different wall thicknesses, the spacing between right angled panel 213 of the securing flap 203 and the frame retaining tab 205 of flange 210 is preferably adapted to correspond to a selected wall thickness, or to a spacing slightly larger than the selected wall thickness, to keep the support frame 200 secured in a wall opening against tearing out. Alternatively, inserts can be placed between right angled panel 213 of each securing flap 203 and the associated retaining tab 205, to make up for any difference between a wall thickness that is smaller than the size of the securing flaps 203. The panels that together form securing flap 203, can form an angle that is less than or greater than 90 degrees. Although the hinges used in the preferred embodiment are living hinges, other types such as continuous hinges can be used and suitable hinge constructions will be readily apparent to the person skilled in the art.

Figure 26:
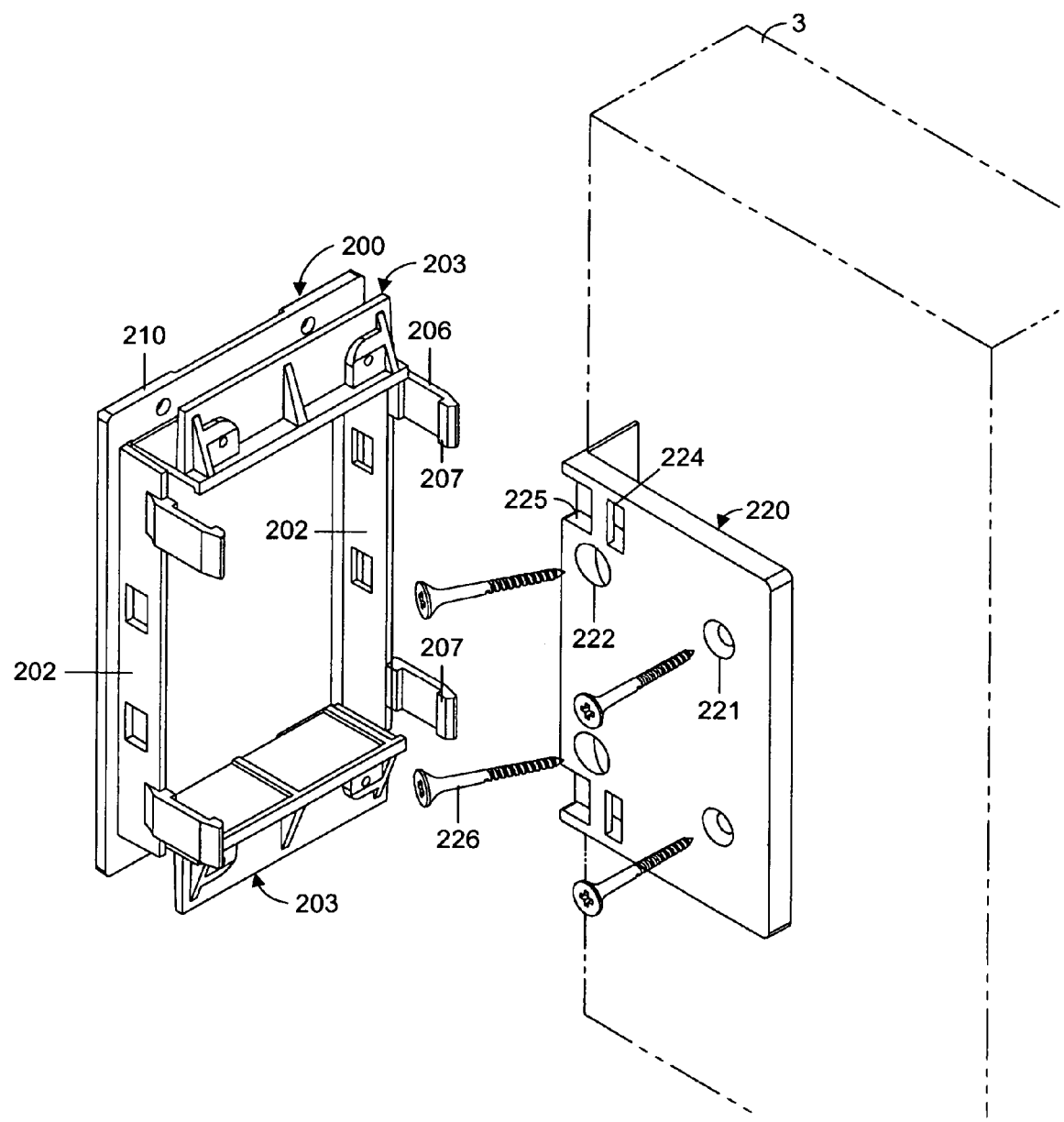
FIG. 26 shows an orthogonal view of an electrical box mounting frame and mounting bracket in accordance with the invention.

In some locations or jurisdictions, electrical boxes cannot simply be fixed to a wall panel, but must be fastened to the wall supporting structure, such as wood or metal studs. To accommodate this requirement, the invention provides a mounting bracket 220 as shown in FIG. 26. The mounting frame 200 preferably includes inwardly directed hook shaped ends 207 which are formed onto each side-wall 202 of the frame 200 to engage with the stud mounting bracket 220. Mounting bracket 220 is a right angled member that will fit around a front corner edge of a wall stud 3. Two screw openings 221 allow one end of the mounting bracket to be fastened to the stud 3, preferably by wood screws 226. The bracket has slots 225 for the mounting arms 206 to permit insertion of the arms 206 into slots 225 which correspond in cross sectional shape with mounting arms 206. Openings 224 at the end of slots 225 accommodate the hooked ends 207 of the mounting arms 206 for locking of the arms in the slots 225. Angled screw openings 222 allow complete fastening of the bracket 220 to the wall stud 3 from the other side of the support frame 200, as in the case when a wall has been secured to the wall stud which inhibits access to the bracket 220. In practical use, screws are first used to secure the mounting bracket 220 to the wall stud 3 using screw openings 221. The hooks of the mounting bracket arms 206 can easily pass through the slots 225 because the material of the mounting bracket 220 should be flexible enough to allow for play between the mounting bracket 220 and the wall stud 3. Once the mounting frame 200 is fully inserted into the mounting bracket slots 225 and the hooked ends rest in hook openings 224, screws can be used to fasten the mounting bracket 220 to the wall stud 3 via angled screw openings 222. The mounting frame 200 is then effectively locked into the mounting bracket 220 because the hooked ends can no longer pass through the slots 225.

Figure 27:
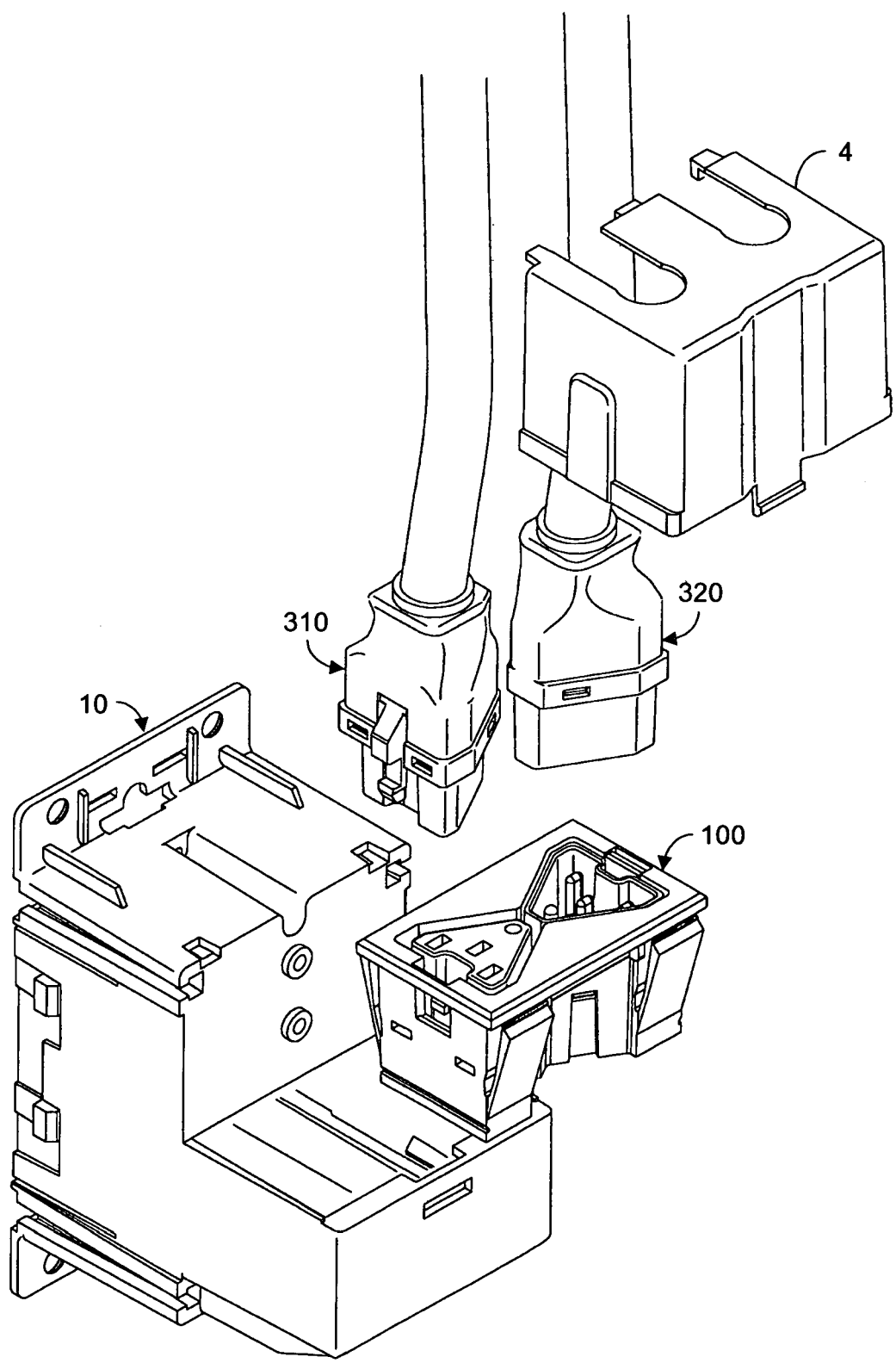
FIG. 27 shows an exploded view of an electrical box and connection components in accordance with the invention.
Figure 28:
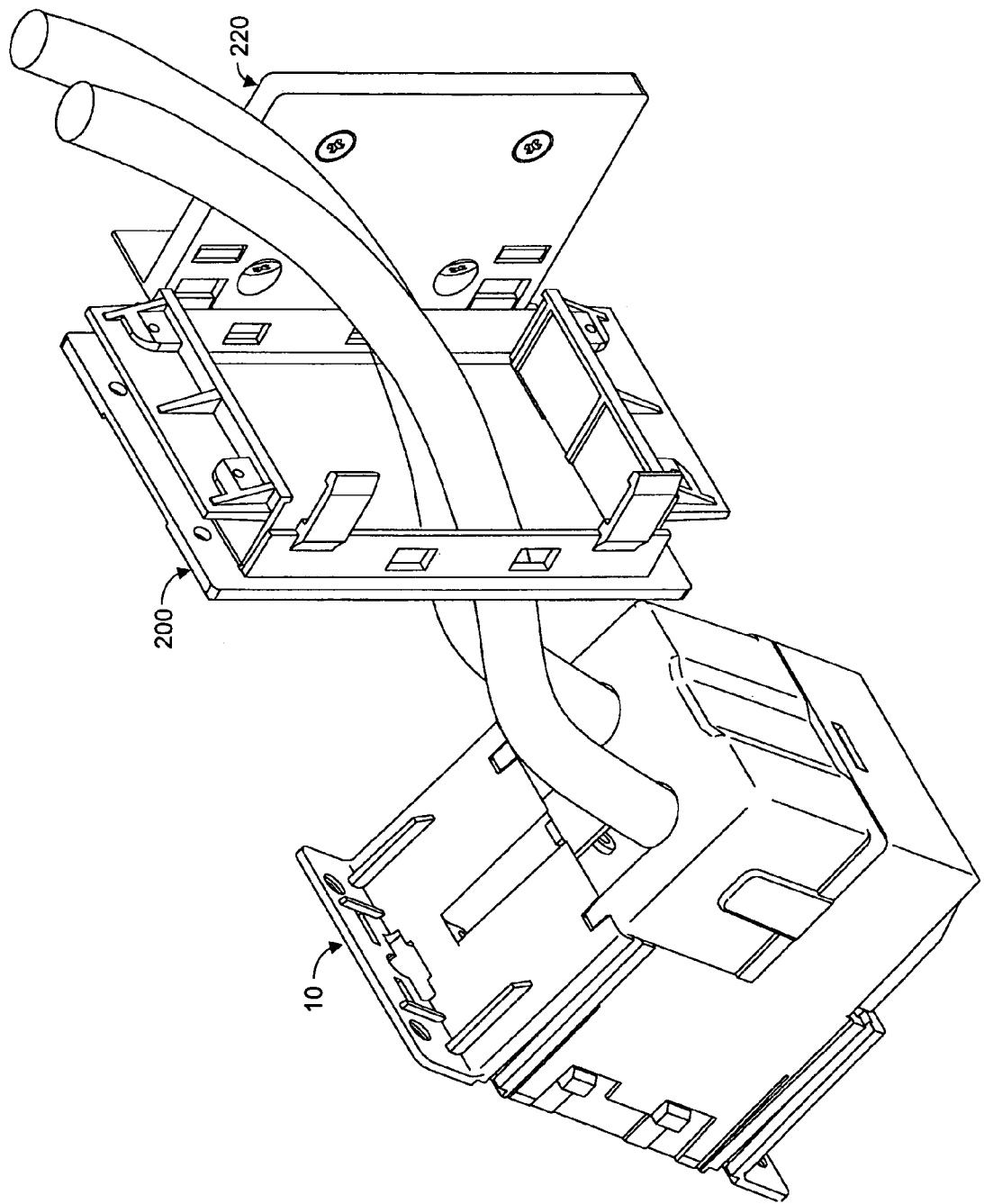
FIG. 28 shows an orthogonal view of the electrical box and assembled connection components of FIG. 27 before installation into the mounting frame of FIG. 19.
Figure 31:
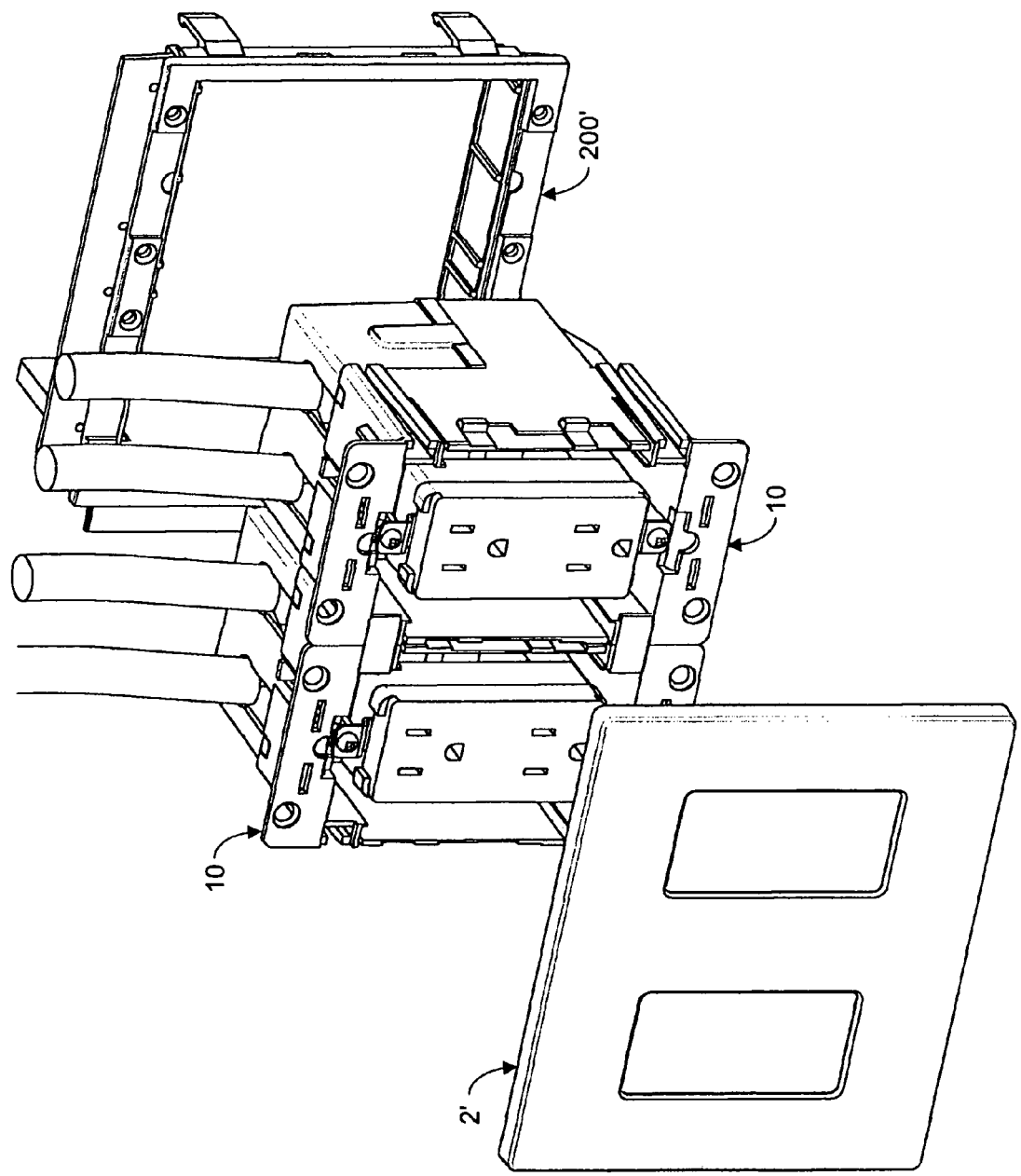
FIG. 31 shows an orthogonal exploded view of the combination of the pair of electrical boxes of FIG. 17 and mounting frame of FIG. 25 in accordance with the invention.

FIGS. 27 to 31 sequentially depicts the assembly of the electrical box and system as they would be used with each other for installing a fixture receptacle into a wall opening in accordance with the invention. FIG. 27 shows an electrical box 10 with a receptacle base 100, male and female plug units 310, 320 which will be described in more detail below, and dust cover 4 prior to complete assembly. Fixture receptacle base 100 is inserted into the connector box 12 of electrical box 10. Receptacle base 100 provides an interface between the electrical power or signal input/output supply and a functional insert in the electrical box 10. Plug units 310 and 320 supply or transfer power or signals to and from the receptacle base 100. A dust cover 4 is added to cover the connector box 12 and any plug units that may be inserted into the receptacle base 100 inserted therein. Dust cover 4 preferably also secures plug units inserted into the fixture receptacle base from being torn out by resting against a rear end of the male and female plug units 310, 320. FIG. 28 shows the electrical box of FIG. 27 after completed assembly, prior to insertion into mounting frame 200. FIG. 29 illustrates the electrical box 10 fully inserted into the mounting frame 200 and FIG. 30 shows the electrical box 10 having a functional insert 1, inserted into a mounting frame 200, which is secured to mounting bracket 220. An aesthetic cover 2 snaps into place to cover the face of electrical box 10. FIG. 31 shows a pair of ganged electrical boxes 10 prior to insertion into a mounting frame 200' and placement of a matching aesthetic cover 2' according to an embodiment of the present invention.

Preferred embodiments of the present invention have been described, but variations in the electrical box 10 and mounting frame 200 are possible in light of the above teachings. Although connector receptacle housing 24 (see FIGS. 2-5) is preferably positioned at the bottom of the electrical box rear wall (FIGS. 4 and 5) for ease of insertion of the electrical box into the mounting frame 200 when wired from above, the receptacle housing can be positioned at any vertical location along the rear wall or can be fully integrated into the electrical box 10 and oriented such that the face of the receptacle housing 24 is parallel to the face of main enclosure 11. Receptacle housing 24 can also be open laterally or downwardly. Although slits 16 preferably extend from the face of main box 11 at right angles, angles other than 90 degrees are possible, as long as the slits extend to a depth sufficient to form flexible side panels in the side walls 17. Separate panels can be connected to the side walls 17 with spring loaded hinges in place of the preferred integrally formed flexible side panels. To prevent dust entering the electrical box 10, the slits are preferably narrow, however slits formed as wide gaps, and more than two slits 16 can be formed in each side wall 17 to form multiple flexible side panels 19. In the case of multiple flexible panels, a single retaining structure is preferably formed on each flexible panel 19, whereby the retaining structure is formed as openings instead of retaining studs 20 in the side wall 17. The retaining structure can be formed as a single or multiple number of openings instead of the preferred protruding studs. The flexible panel and retaining structures can be formed on the top and bottom of the electrical box instead of the side walls 17. Recesses 26, or portions of the recesses in side wall 17, can be openings to further facilitate the ganging feature of the electrical boxes 10. Connection grooves 18 and corresponding spline arms 401 can have a circular or other geometric shape as long as the shape of the connecting grooves 18 is sufficiently complementary to the shape of the spline arms 401 to assure a reliable connection.

In an alternate embodiment of the mounting frame 200, flange 210 does not form a full rectangle, but instead only includes four corners. Although the securing flaps 203 are preferably positioned at the top and bottom edges of the mounting frame 200, they can be positioned along any two opposite sides of the frame and can even be positioned on all sides of the frame. The size of securing flaps 203 can be shorter than an edge of the rectangular opening 211 it is connected to, or a multiple number of individually operative securing flaps 203 can be connected to an edge of the rectangular opening 211 in place of a single large securing flap. Securing flaps 203 can slide on rails to engage a wall opening when the electrical box 10 is inserted into the mounting frame. Side walls 202 do not form a continuous wall, but instead are formed as short segments at locations corresponding to positions of the electrical box retaining structures to reduce the use of material. The mounting frame of an alternate embodiment can be constructed to receive standard prior art metal electrical boxes.

In addition to the electrical box assembly, the present invention also provides a modular wiring system for fail-safe wiring connection of the electrical box and the functional insert respectively placed therein with a power, data, signal supply or control, or a data, power, signal, etc. consumer or controller. To avoid wiring errors, the wiring system of the invention provides male and female plug assemblies for permanent placement of wire or cable ends as will be further described in detail in the following. Furthermore, the shape and placement of the connector prongs in the plugs and the connector receptacle in the electrical box is keyed accordingly to the intended type of connection to prevent cabling errors.

The modular system of the invention includes male and female receptacles and male and female plugs, whereby the number of components of the system is reduced by the use of common components for both plugs and receptacles as well as male and female plugs. As is apparent from FIGS. 36 to 41, each receptacle includes a receptacle base (FIGS. 39 and 40) and male and female connector modules 300, 301. Furthermore, each plug unit (FIGS. 36 and 37) includes a plug housing 170, 190 and one of the male and female connector modules 300, 301. The male connector modules in the plugs and receptacles are thereby of identical construction as are the female connector modules in the plugs and receptacles. Each male connector module 300 is constructed to interlock with a female connector module 301 as shown in FIG. 38. Each connector module 300, 301 includes a connector base 150, a set of male prongs 142, 143, or female prongs 122, 123, and either a male connector body 120 or a female connector shroud 140. The same connector base 150 is used for the male and female receptacles and the male and female plugs. Thus the complete modular system includes a reduced number of parts, which in the basic embodiment are, a connector base 150, a male connector body 120, a female connector shroud 140, male and female plug housings 170, 140, a receptacle base 150 and male and female prongs 142, 143, 122, 123.

To avoid wiring or connection errors, the orientation of the contacts in the connector base 150 and the male connector body 120 are varied for different types of connections and different wiring schemes. This provides a keyed wiring and connector system as will be described in more detail further below.

Figure 32:
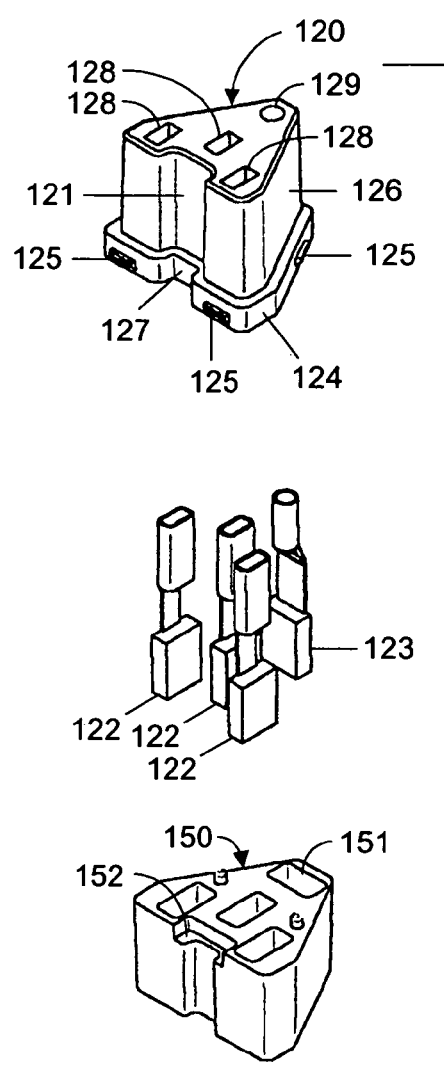
FIG. 32 is an exploded view of a male connector module in accordance with the invention.
Figure 33:
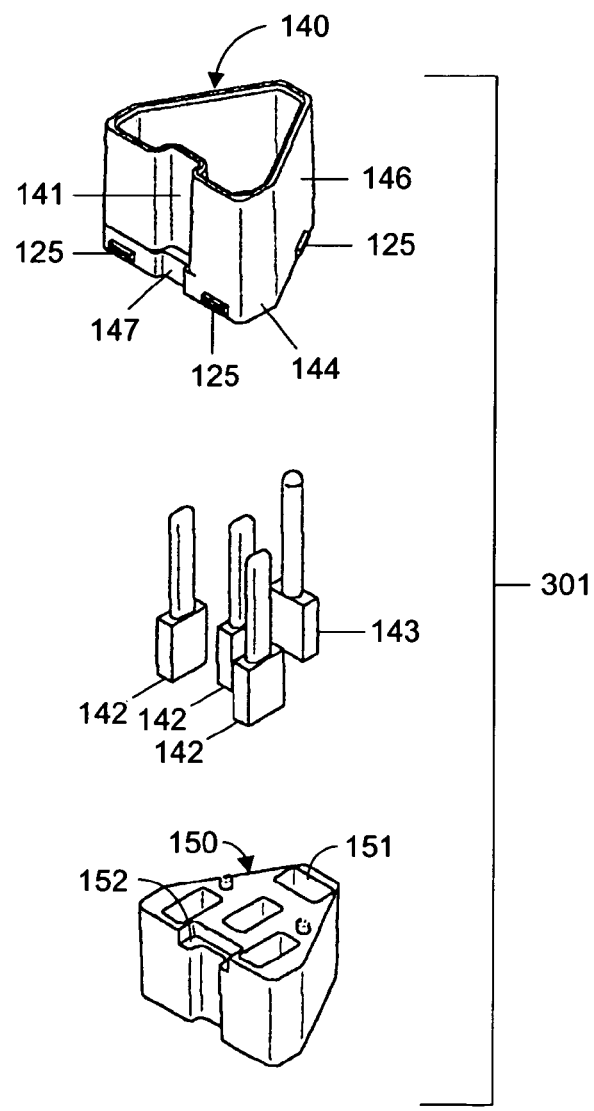
FIG. 33 is an exploded view of a female connector module in accordance with the invention.

FIG. 32 shows an unassembled male connector module 300 with a corresponding male connector body 120 and a connector base 150. FIG. 33 shows an unassembled female connector module 301 with a corresponding plug shroud 140 and a connector base 150. The male connector module 300 includes the male connector body 120, the connector base 150, three generally rectangular female prongs 122 and a generally round prong 123. The male connector body 120 includes a cap shaped main body 126 having a triangular cross-section and a keying groove 121. The male connector body 120 has a circumferential shoulder or base 124, which also has a keying groove 127, and overall has a slightly larger outline than the cap shaped main body 126 of the connector body 120. Fixed to the perimeter of base 124 are locking tabs 125 for interlocking the base 124 with a complementary component as will be described further below. Openings 128 and 129 in the face of male connector body 120 are sized to receive the male prongs of a complementary female connector module as described below. Openings 151 in the face of connector base 150 are formed to receive the base of the female prongs 122 and 123 which is of identical construction for each prong and functions as a wire trap as will be described further below. The close fit of the prong bases in openings 151 ensures proper alignment of the female prongs 122 and 123 with the openings 128 and 129 respectively. Recess 152 is formed to accommodate retaining clips, which will be discussed later. The keying grooves 121 and 127 ensure that the male connector body 120 cannot be engaged with a complementary female connector module (discussed further below) in more than one orientation.

The female connector module 301 includes a female plug shroud 140 having an equilateral triangle shaped sleeve comprising a keying groove 141 extending inwardly, three rectangular male prongs 142 and one round male prong 143. All of said prongs are recessed at the base 144 of the female plug shroud 140. The shroud base 144 also has an inwardly directed keying groove 147. The length of the prongs is fixed such that their tips remain below the top edge of the main body 146 of the shroud 140. The shroud main body 146 is essentially a protective sleeve for the prongs 142 and 143. Fixed to the perimeter of the shroud base 144 are locking tabs 125 for interlocking the shroud base 144 with a complementary component. Openings 151 in the face of connector base 150 are formed to receive the base of the male prongs 142 and 143 to ensure proper alignment of the male prongs 142 and 143 with corresponding openings in the base of shroud 140 (not shown). To further reduce the number of elements of the modular system of the invention, openings 151 in the face of connector base 150 are of the same size and orientation for both the male and female connector module of complementary connectors, and the bases of all female prongs and male prongs used are preferably of identical construction to reduce the number of components of the system and for ease of assembly.

Figure 34:
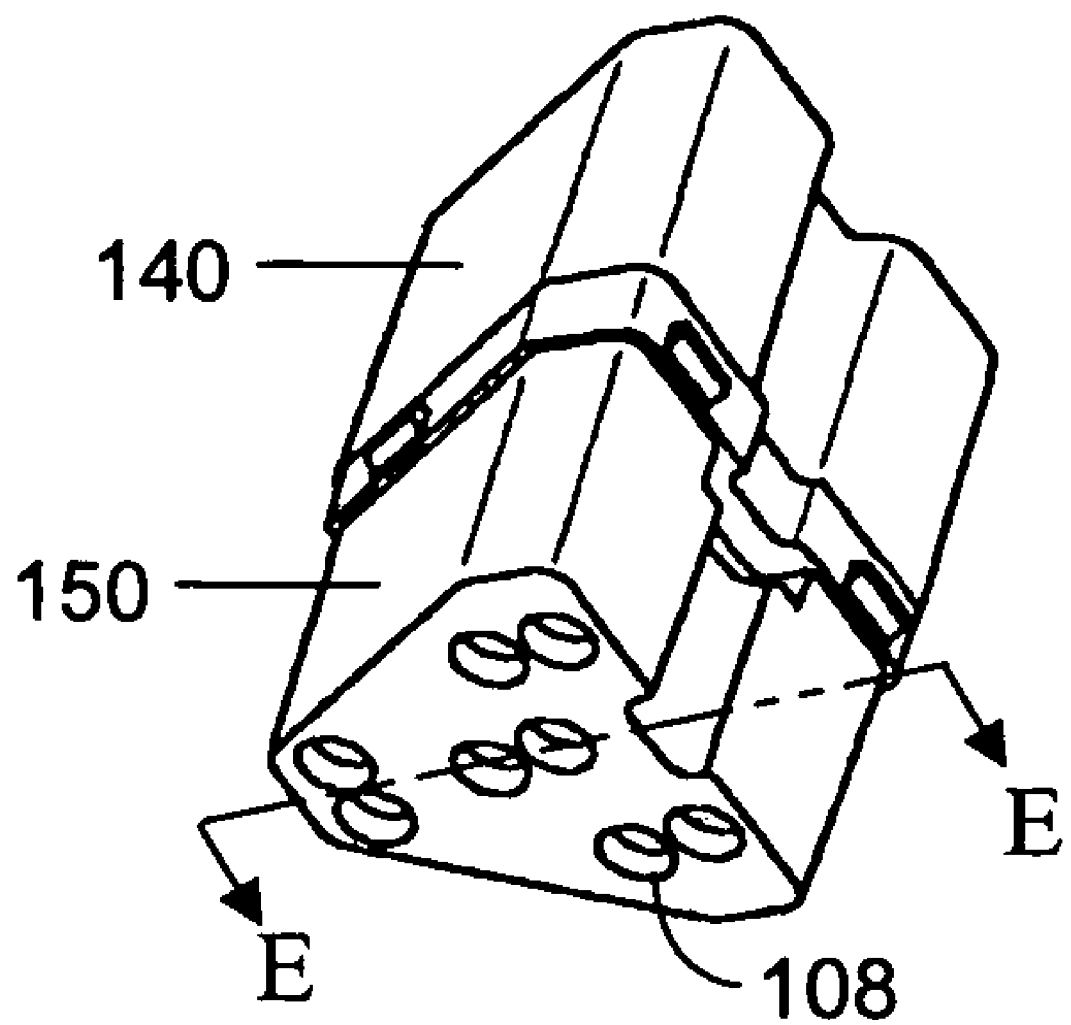
FIG. 34 shows an orthogonal view of the female connector module of FIG. 33, illustrating the bottom side.

FIGS. 34 and 35 show the assembled male connector module 300 and female connector module 301 respectively. Wiring access holes 108 are formed through the bottom of the connector bases 150 to allow insertion of wires that will be electrically coupled to the prongs encased within the modules. The detailed construction of the prongs will be discussed in more detail later.

The male connector body 120 and the female plug shroud 140 have been designed to be complementary units. The cap shaped main body 126 is smaller than the main body 146 of the female plug shroud 140 so that the male connector body can be inserted into the female plug shroud 140. The male plug keying groove 127 is wider and deeper than the female plug shroud keying groove 147. The lengths of the main bodies and the perimeters of the bases are also the same so that engagement with the single type connector base 150 is possible.

FIG. 36 shows an unassembled female plug unit 320 with a corresponding female connector module 301 and a female plug casing 190. FIG. 37 shows an unassembled male plug unit 310 with a corresponding male connector module 300 and a male plug casing 170. Male plug casing 170 has an equilateral triangle shape and includes a rim 171 for receiving the base 124 of male connector body 120 and having openings 107 placed and shaped for receiving the locking tabs 125 on base 124 in the assembled condition of the male connector module 300. During assembly, locking tabs 125 snap into openings 107 to hold the plug module 300 in the plug casing 170. A wire feed opening 172 is provided in the back of the male plug casing 170 for connection of wires to the male connector module 300. A male hook element 173 is formed on the male plug casing 170 at a location corresponding to the position of the keying groove 121 of the cap shaped main body 126, and extends into that keying groove in the assembled condition of the male connector module 300. Male hook element 173 has a hook 178 at a free end and is connected at its opposite end to the male plug casing 170, and has a disengagement button 177. Pressing down on the button will force the hook element 173 inwardly in the grooves 121 and 127.

Female plug casing 190 is identical to the male plug casing 170 except for the female hook element 191, which replaces the male hook element 173. Female plug casing 190 accommodates base 144 of a female plug shroud 140 through locking engagement of base 144 with rim 171 and especially locking tabs 125 with openings 107. The female hook element 191 includes a loop 192 at one end, and a lever 193 at its opposite end. At an intermediate location, the hook element is pivotally connected to the female plug casing 190. Pressing down on lever 193 will force the hook element 191 to move away from base 144 and the grooves 141 and 147 therein. The connector bases 150 of the male connector module 300 and female connector module 301 are sized to fit inside their respective plug casings.

Figure 48:
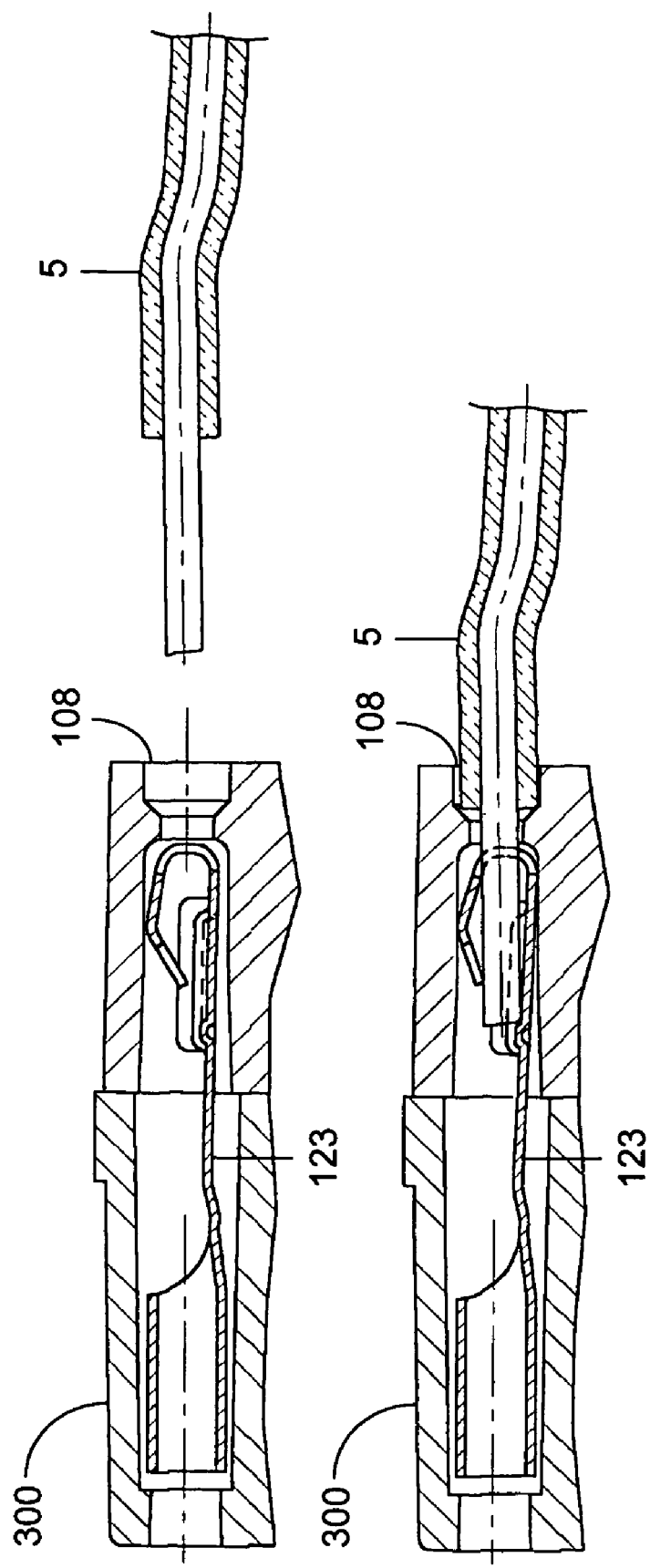
FIG. 48 is an enlarged cross-sectional view of FIG. 46, showing a wire in the un-inserted and inserted positions.
Figure 51:
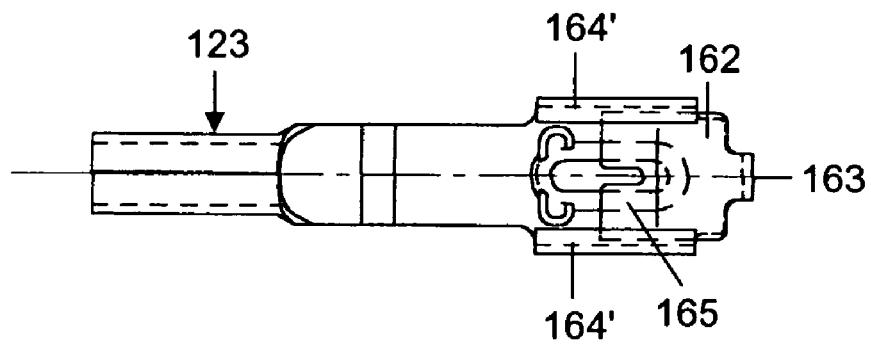
FIG. 51 is a top plan view of the female round prong with wire trap of FIG. 50.
Figure 52:
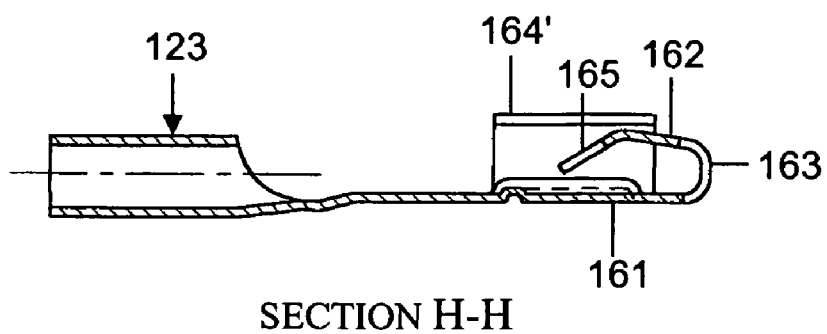
FIG. 52 is a cross sectional view of the female round prong with wire trap of FIG. 50 taken along line H-H.
Figure 54:
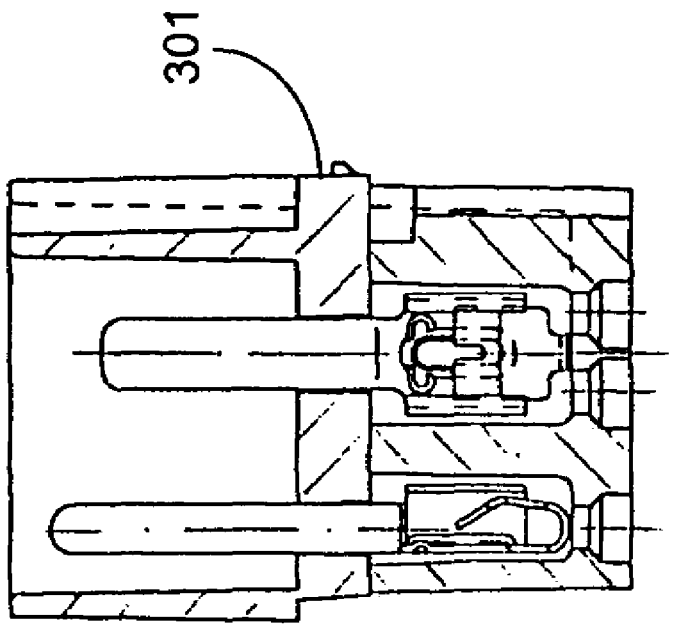
FIG. 54 shows a cross sectional view of the male connector module of FIG. 34 inserted with male prongs of FIGS. 49 and 50, taken along line E-E in accordance with an alternate embodiment of the invention.
Figure 53:
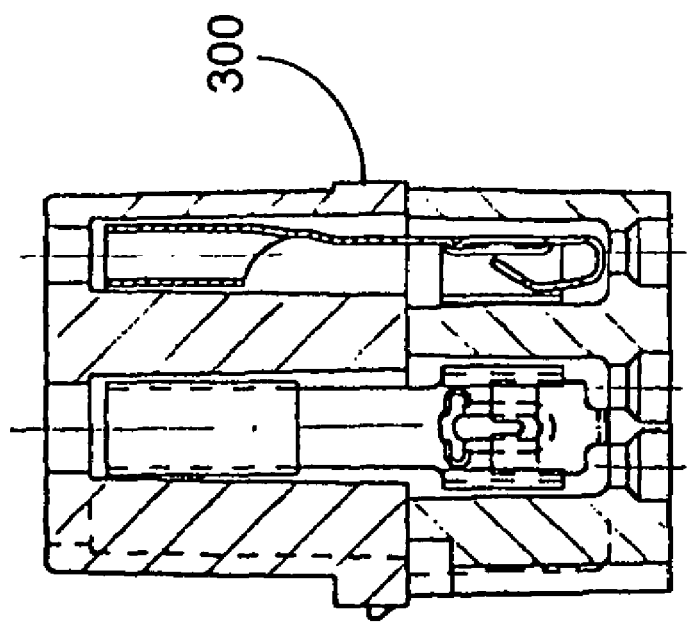
FIG. 53 shows a cross sectional view of the male connector module of FIG. 35 inserted with female prongs of FIGS. 49 and 50, taken along line F-F in accordance with an alternate embodiment of the invention.

In practical use, using a male plug casing 190 and male connector module 300 by example, a cable containing wires is drawn through the wire feed opening 172, after which stripped wire leads are inserted into the openings 108 in the base 150 of the pre-assembled male connector module 300 (see FIG. 48). The connector module 300 is then snapped into the plug casing 190 to form an assembled male plug unit 310. A plastic material is injected into the male connector 300 via wire feed opening 172 to provide additional electrical insulation and to prevent the cable from tearing out from the male connector 300.

Fully assembled male and female plug units are shown in FIG. 38. Male plug unit 310 with male plug casing 170 and male connector module 300 can be inserted into any female plug unit 320 with female plug casing 190 and female connector module 301. The male hook element 173 will automatically interlock with the female hook element 191 to hold the male and female plug units together.

The male plug unit 310 can also be inserted into a female connector module 301 that is mounted inside a receptacle base 100. The male hook element 173 will thereby automatically lock with a female retaining clip 103 inserted into the receptacle base 100, to hold the male plug unit 310 in place. Similarly, the female plug unit 320 can be inserted into a male connector module 300 that is mounted inside a receptacle base 100. The female hook element 191 will thereby automatically lock with a male retaining clip 102 inserted into the receptacle base 100, to hold the female plug unit 320 in place.

Figure 40:
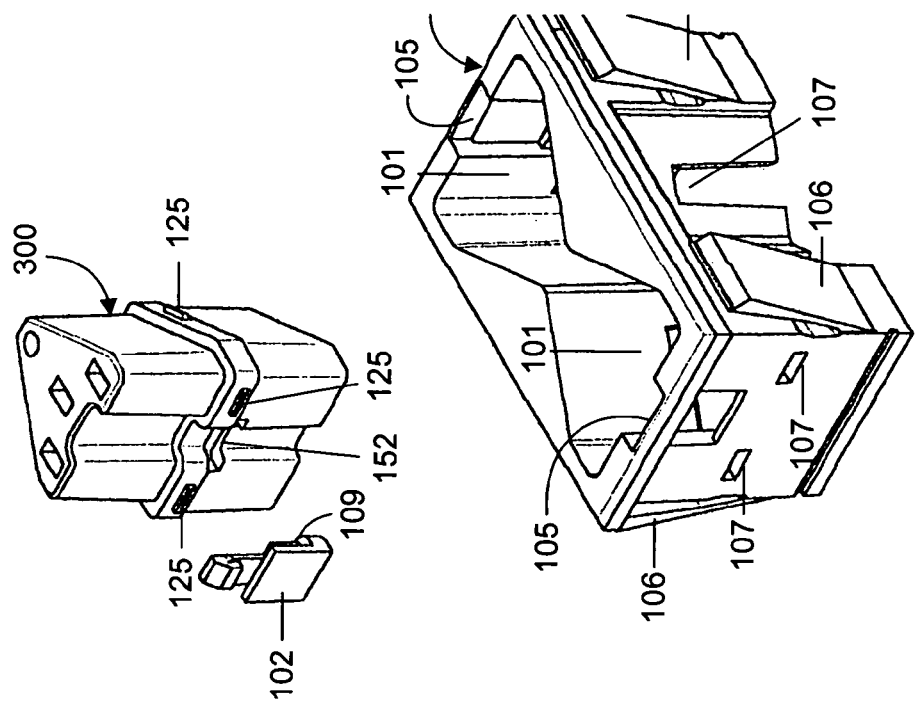
FIG. 40 shows an exploded view of a male connector module of a fixture receptacle base in accordance with the invention.
Figure 39:
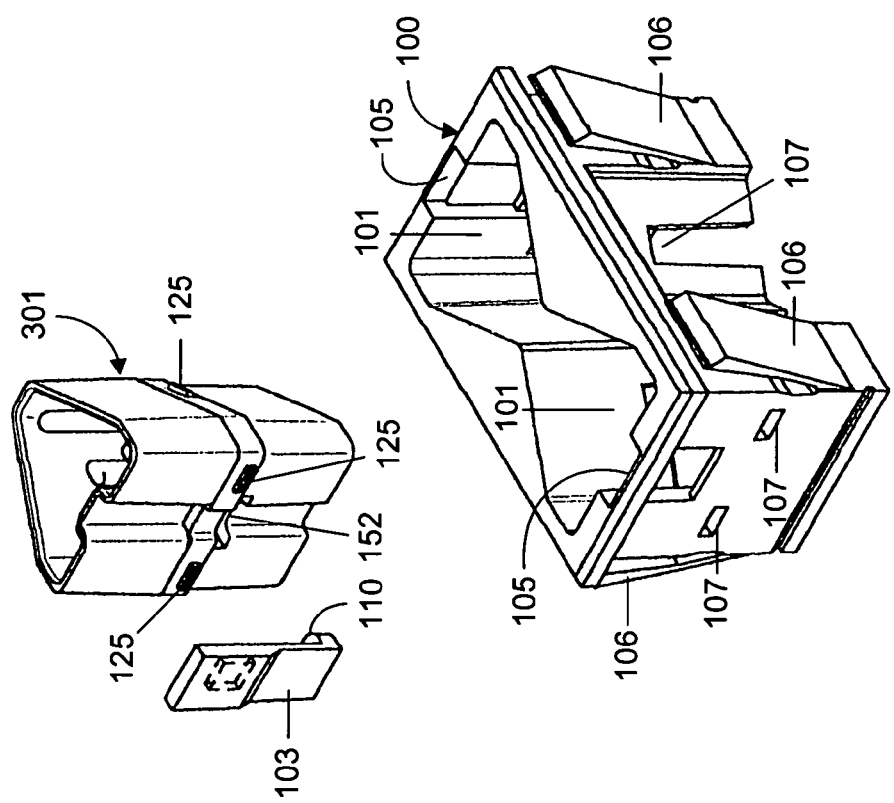
FIG. 39 shows an exploded view of a female plug module of a fixture receptacle base in accordance with the invention.

FIGS. 39 and 40 show receptacle bases 100 with an assembled female connector module 301 and an assembled male connector module 300 respectively. Receptacle base 100 contains two, equilateral triangular shaped recesses 101, each of which can accommodate either a male connector module 300 or a female connector module 301. Foot 109 of female retaining clip 102 for the male connector module 300, or foot 110 of the male retaining clip 103 for the female connector module 301 fits into the recess 152 in the connector base 150 of the male or female connector module, and is locked in a recessed side pocket 105 in the side wall of each triangular recess 101. When connector module 300 or 301 is snapped into the recess 101 with the foot 109 of a retaining clip 102 or 103 inserted into recess 152, the retaining clip is effectively locked into position in the side pocket 105 and prevented from being pulled out. Flexible tabs 106 are formed at each corner of the receptacle base 100 and flare outwards from the base towards the top of the receptacle base. The design allows for easy insertion of the receptacle base 100 into receptacle housing 24 of the electrical box 10 (see FIG. 27). But once the receptacle base 100 is inserted, the base locking tabs 106 will lock the receptacle base 100 into place. Openings 107 accommodate the locking tabs 125 of either the male connector module 300, or female connector module 301 respectively, to hold the modules in place within the recess 101 once they are inserted. Coupling of wires to the connector modules 300 or 301 is done via a special self-gripping wire trap 160, which will be discussed in more detail below.

Figure 41:
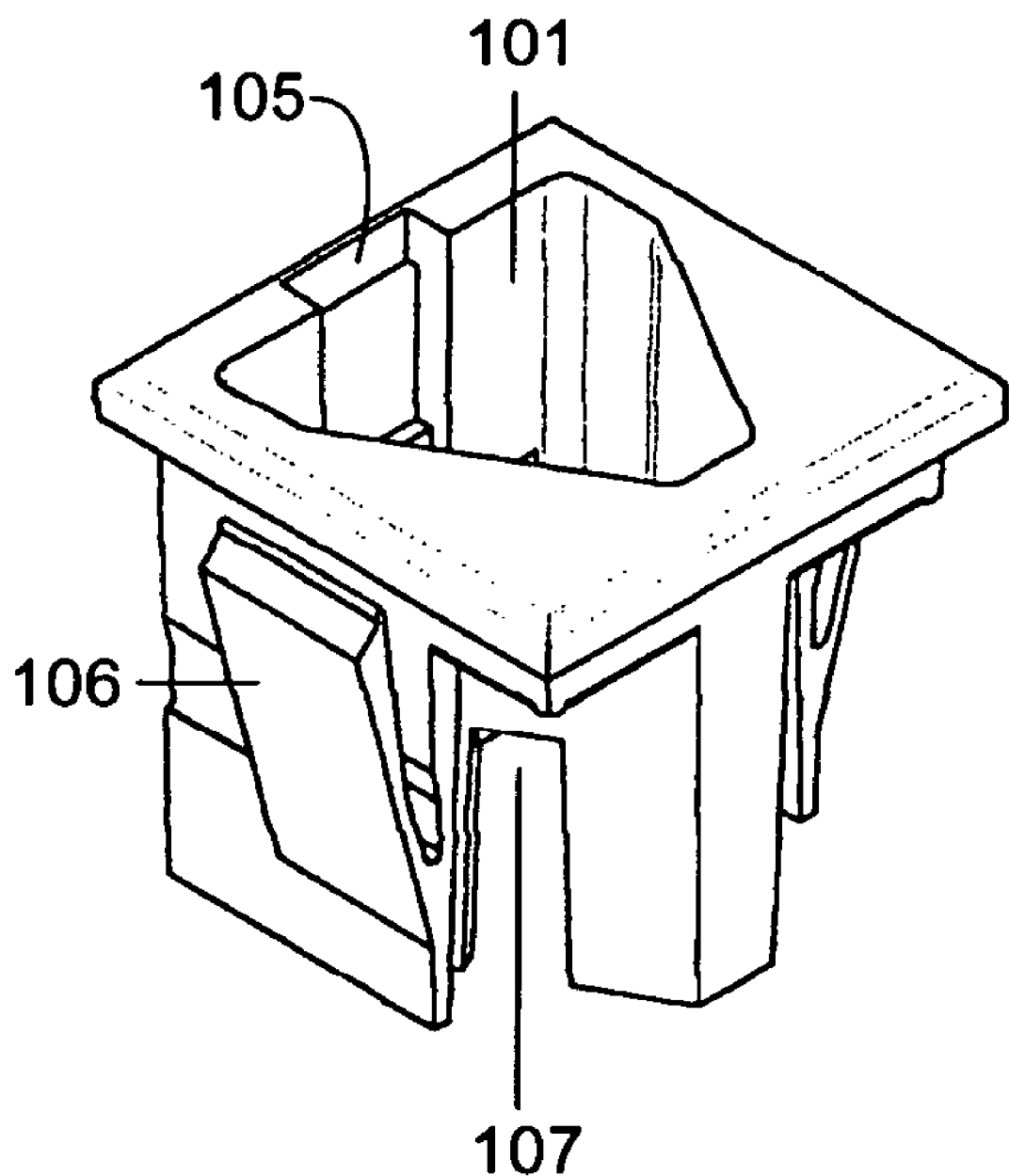
FIG. 41 shows an orthogonal view of a single fixture receptacle base in accordance with the invention.

FIG. 27 illustrates a receptacle base 100 with fully assembled male and female connector modules before installation in the electrical box 10. The male connector module can receive power or other signals for distribution to an installed functional insert or device, while the female connector module can be an output to redistribute the power. This allows multiple electrical boxes 10 to be connected in a daisy chain configuration, which uses less wiring cost than conventional methods in which each electrical box is wired separately, manually and often receives a power feed wire from the ceiling. If it becomes necessary to remove an electrical box from the wall for maintenance, the male and female plug units only need to be connected together so that the other electrical boxes connected in the chain can still receive power. The fixture receptacle base 100 of FIG. 39 illustrates one possible configuration for the arrangement of the recesses 101. A single recess receptacle connector can be formed as shown in FIG. 41, as can receptacles with multiple recesses arranged in a circular configuration around a single round ground prong such as male prong 123 or female prong 143. For example, by using equilateral shaped connector modules, it is possible to have a receptacle with six different corresponding triangular recesses, with respectively different prong orientations, each for a different wiring application, such as power, high voltage, low voltage, telephone, data etc.

The use of the modular connectors as previously described allows for quick and simple connection of power or other signals to the electrical box 10. The shaped connector modules prevent incorrect connection of the plugs into their receptacles. All components of the modular system described above are commercially available from Electec Ltd., Ottawa, Ontario.

Figure 44:
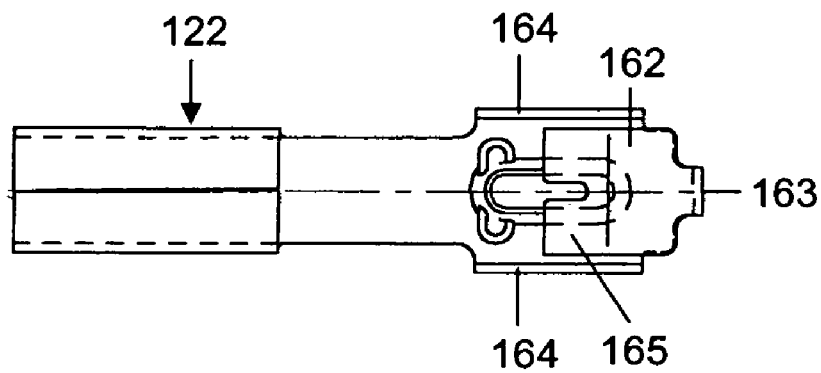
FIG. 44 is a top plan view of the female rectangular prong with wire trap of FIG. 42.
Figure 45:
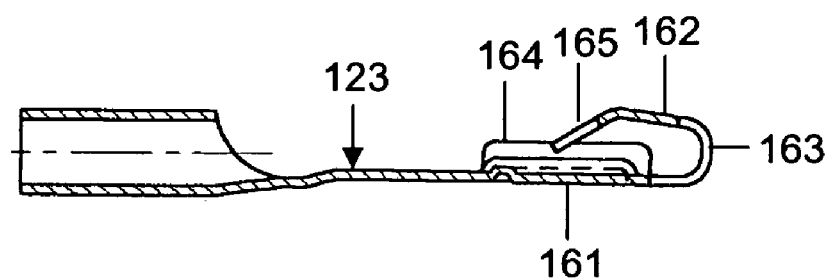
FIG. 45 is a cross sectional view of the female round prong with wire trap of FIG. 43 taken along line G-G.
Figure 47:
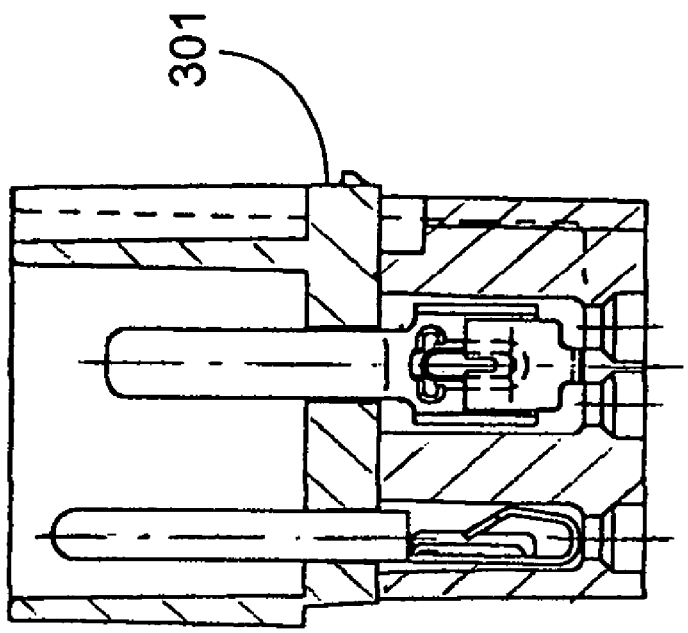
FIG. 47 shows a cross sectional view of the female connector module of FIG. 34 inserted with male prongs of FIGS. 42 and 43, taken along line E-E.
Figure 46:
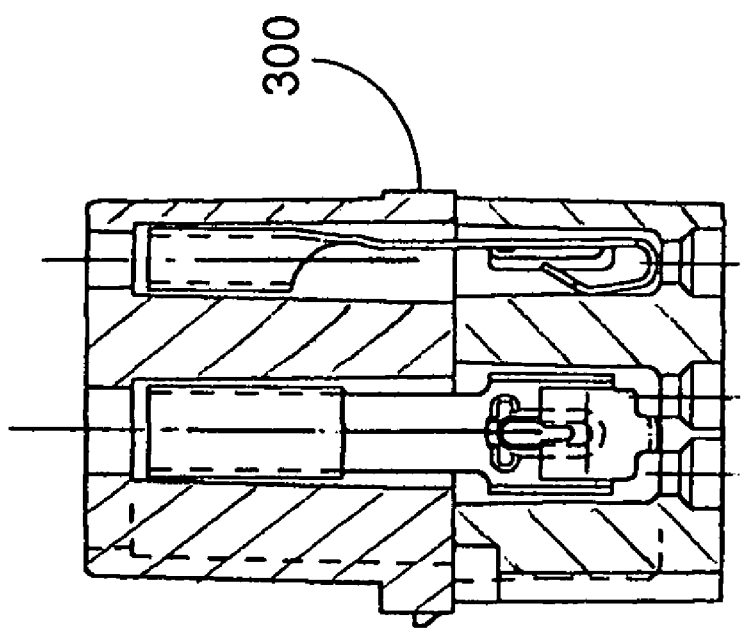
FIG. 46 shows a cross sectional view of the male connector module of FIG. 35 inserted with female prongs of FIGS. 42 and 43, taken along line F-F.

Connection to the prongs within connector modules 300 and 301 is achieved by way of self-gripping wire traps 160 formed on the base of male prongs 142 and 143, and female prongs 122 and 123 as shown in FIGS. 42 and 43. Each self-gripping wire trap 160 is a stamped piece of metal preferably made of an alloy consisting of phosphor and bronze (available from Electec Ltd.), and consists of a bottom plate 161 and a top plate 162, connected to an edge of bottom plate 161 by a curved spring segment 163. The top and bottom plates are substantially parallel to each other. Side edges of bottom plate 161 have been bent up towards the top plate 162 to form curved partial side-walls 164. An end portion of the top plate 162, opposite to the edge attached to the spring segment 163, has been folded down towards the bottom plate 161 to form a gripping tab 165. The size of the top plate 161, the bottom plate 162 and the spring segment 163 has been selected, for example, to be large enough to accommodate commonly used American 8 to 16 gauge copper wires 5. The position of the spring segment 163 is centred about the edges of the top and bottom plates 161 and 162 to allow insertion of a wire to each side of the spring segment. The side-walls 164 serve to keep inserted wires within the wire trap 160 and below the associated gripping tab 165. Top plate 161 is preferably angled downwards towards the bottom plate 162 to form a slight wedge with bottom plate 162 as shown in FIG. 44. This is to allow the wire trap 160 to be inserted into correspondingly sized openings 151 of connector base 150. FIG. 48 shows a cross-section of a portion of male connector module 300 before and after a wire 5 is inserted into wiring access holes 108 to engage wire trap 160. When wires 5 are inserted into the wire trap 160 as shown in FIG. 48, they will engage and force open the gripping tab 165 to allow entry of the wires. The size of opening 151 of connector base 150 will limit the deflection of top plate 161, allowing gripping tabs 165 to squeeze the wire with a force such that the tab edges will dig into the metal of the wires. Once inserted, the wires are secured from accidental removal from the prongs within the connector modules. Since wires can be of different gauges, a single gripping tab 165 would not be effective in gripping both a smaller gauge wire and a larger gauge wire. This problem is solved by introducing slit 166 cut in the centre of gripping tab 165 to essentially create two separately operating gripping tabs that can individually engage wires of varying gauges. The wire trap 160 of this embodiment will function best when the size of openings 151 in the connector base 150 are formed to closely correspond to the size of the wire trap 160. If the openings 151 are too large, wire trap 160 may not grip inserted wires with sufficient force to prevent them from being accidentally torn out when the spring segment 163 creates only a low spring force.

Figure 55:
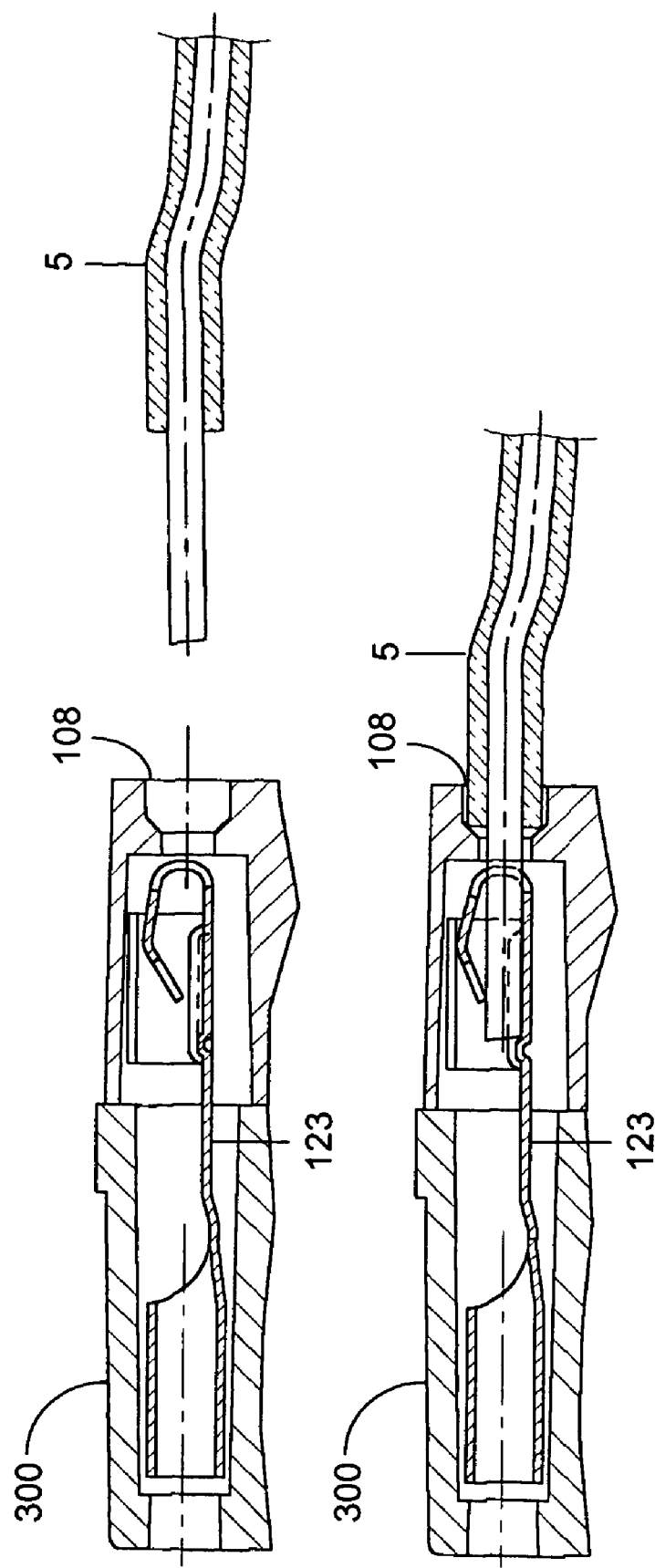
FIG. 55 is an enlarged cross-sectional view of FIG. 53, showing a wire in the un-inserted and inserted positions.

An alternate embodiment of the wire trap 160 is shown in FIGS. 49 to 52, where the side-walls 164' of wire trap 160' are formed to partially wrap around the top plate 161'. Wire trap 160' with side walls 164' is not tolerant on the size of openings 151 in connector base 150. The side-walls 164' limits the deflection of top plate 161. As shown in FIG. 55, openings 151' are much larger than the wire trap 160, but since the side walls 164' limits the deflection of top plate 161', the inserted wire 5 will be gripped with sufficient force to prevent it from being accidentally torn out.

Figure 56:
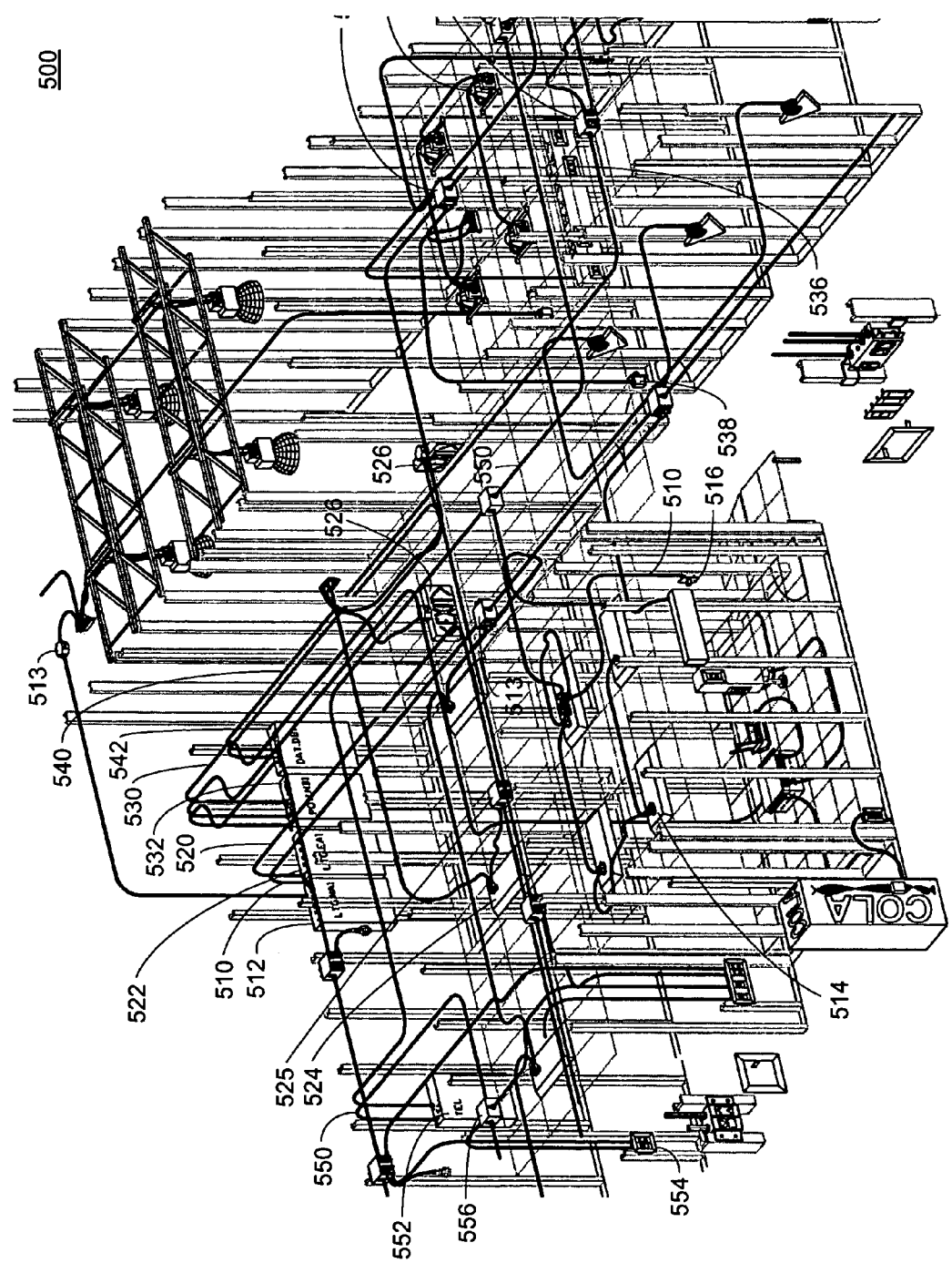
FIG. 56 Shows the electrical wiring system of the invention used in a building floor-plan.
Figure 57:
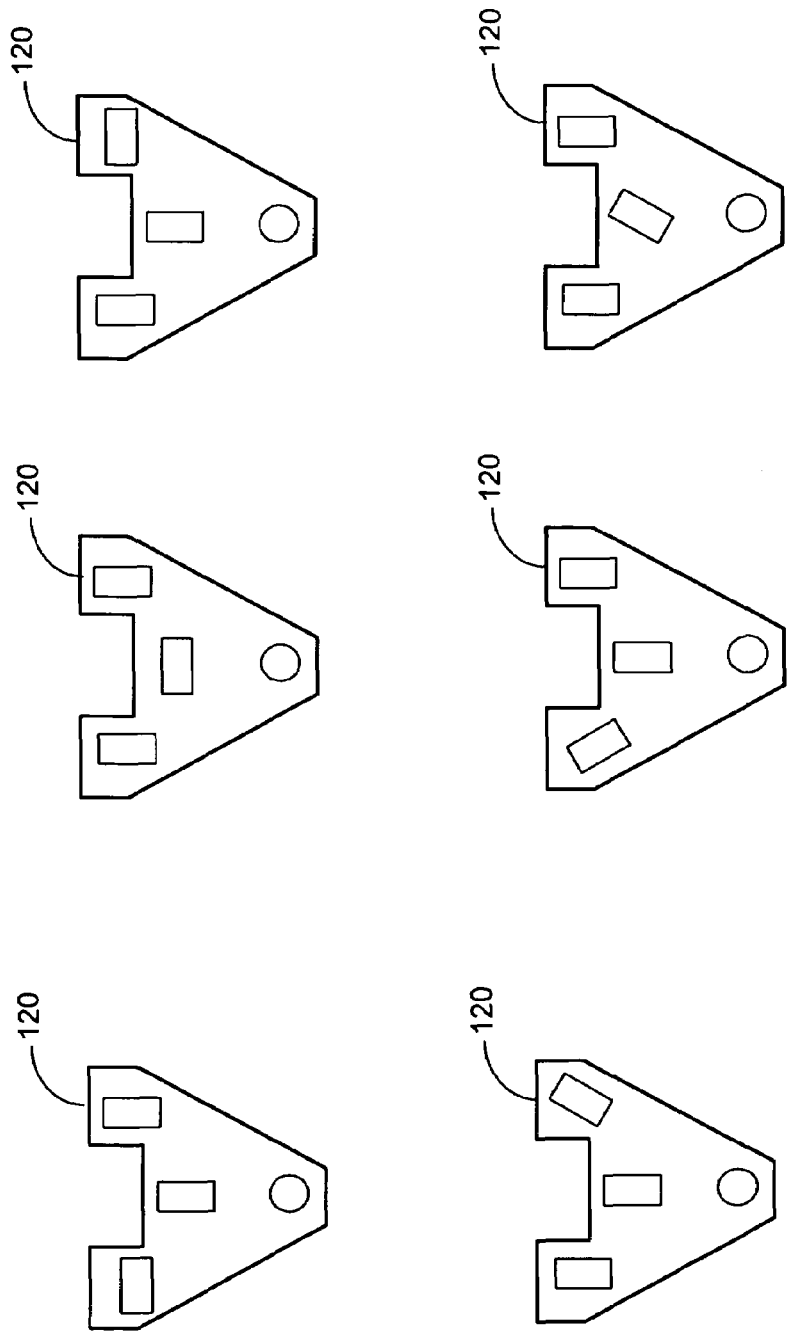
FIG. 57 is an elevated top view of male connector bodies with different prong orientations.

The components of the electrical box wiring system previously described are preferably used together to wire a building, or edifice, in a reduced amount of time while ensuring error free connections to advance completion of the building or edifice construction. Components of the electrical wiring system of the present invention are used to distribute power and signals via wiring cables and distribution boxes throughout the building 500 shown in the layout of FIG. 56. By using the wiring system of the present invention, many different keyed connector modules can be employed to provide error free connection of a power, data or telephone signal source to corresponding destinations. By varying the orientation of the rectangular male and female prongs 142, 143 and 122, 123 and the associated openings 128 in male connector body 120 and recesses 151 in connector base 150, virtually infinite numbers of different keyed connector modules can be produced. It is thereby possible to vary the position of only one, two or all three rectangular prongs. If the position of a prong is changed, the orientation of the prong is rotated 45° or 90° from the default position as shown in FIGS. 32, 33, 36 and 37. Although this limits the overall number of configurations possible, a large number of permutations can still be achieved while each prong orientation is sufficiently different from every other so that reliable keying is achieved with substantially no possibility of male and female connector modules of different prong orientations fitting together. Examples of different prong orientations are shown in FIG. 57. Thus, a fool proof wiring system is provided, wherein not only keyed wires of different power, data or telephone supplies can be produced having plug and receptacle ends that will respectively not fit together with wires of other supply types, but also keyed wires for different tasks within each supply system. For example, wires connecting a power, data or telephone source with an outlet, with a switch and with a distribution box respectively or a switch with an outlet, a switch with another switch, an outlet with another outlet, etc. are possible applications. This will be better understood with reference to the building wiring system 500 shown in FIG. 56. A first type of wire 510 having a first gage is used to connect the high voltage power supply panel 512 with the fluorescent light fixtures 514. First set of keyed male and female connector modules are used on the wires 510 interconnecting the panel 512, the distribution boxes 513 and the fixtures 514, and a second set is used to interconnect the fixtures 514 and the associated wall switch 516. A second type of wires 520 with third and fourth sets of keyed male and female connector modules are used to interconnect the emergency lighting power panel 522 with the light fixture 524, distribution box 525 and exit signs 526. A third set of wires 530 with fifth, sixth, seventh and eighth sets of keyed male and female connector modules are used to interconnect the general power supply panel 532, the lighting fixtures 534, plugs 536, switches 538 and distribution boxes 539. A fourth set of wires 540 with ninth, tenth and eleventh keyed male and female connector modules are used to interconnect the data supply panel 542, the data outlets 544 and the distribution boxes 546. Finally; a set of phone wires 550 with twelfth, thirteenth and fourteenth keyed male and female connector modules is used to interconnect the telephone board 552, the phone plugs 554 and the distribution boxes 556. The sets of first to fourteenth connector modules are identical in construction except for the orientation of their rectangular prongs. The orientation of the prongs in each set is selected such that the respective male and female connector modules of the same set can be connected with one another but not with any other module of any other set. In this way, a fool proof wiring system is achieved which ensures quick and proper wiring of any building.

Applications for the mounting frame and quick connecting universal electrical box include commercial buildings, home or cottage for the distribution and connection of power or data such as telephone or computer network signals.

What is claimed is:

1. An electrical box for insertion into a wall opening and for receiving a plug unit connected to a wiring cable, the electrical box having an enclosure for receiving a functional insert, and a retaining tab for securing the electrical box to the wall, comprising:
   a connector box attached to the enclosure for receiving a receptacle base, which provides an interface between the plug unit and the functional insert; and,
   slits in side-walls of the enclosure for forming a flexible side panel in each side wall.

2. The electrical box of claim 1, wherein the receptacle base includes an input connector module for receiving the plug unit.

3. The electrical box of claim 2, wherein the receptacle base includes an output connector module for receiving another plug unit.

4. The electrical box of claim 1, wherein the slits in each side-wall are parallel to each other.

5. The electrical box of claim 1, wherein each side-wall of the electrical box includes a connection groove for receiving a spline for securing a pair of adjacent electrical boxes together.

6. The electrical box of claim 5, wherein each connection groove extends from a face of the enclosure to a rear of the enclosure.

7. The electrical box of claim 6, wherein each connection groove has a cross-sectional T-shape.

8. An electrical box for use in combination with a mounting frame, comprising:
   a pair of flexible side panels; and,
   a retaining structure formed on each flexible side panel for engagement with a corresponding retaining structure of the mounting frame, and for securing the electrical box to the mounting frame upon insertion of the electrical box within the mounting frame.

9. The electrical box of claim 8, wherein the position of the retaining structure of one flexible side panel is offset with respect to the position of the retaining structure of the other flexible side panel to permit ganging of two or more electrical boxes.

10. The electrical box of claim 8, wherein the retaining structure includes an opening and the complementary retaining structure includes a stud.

11. The electrical box of claim 8, wherein the retaining structure includes a stud and the complementary retaining structure includes an opening.

12. The electrical box of claim 11, wherein each side panel includes a recess for receiving the stud from an adjacent electrical box.

13. An electrical box for insertion into a wall opening and for receiving a plug unit connected to a wiring cable, the electrical box configured for receiving a functional insert, and having a retaining tab for securing the electrical box to the wall, comprising:
- an enclosure for receiving the functional insert;
- a receptacle base electrically connectable between the plug unit and the functional insert; and,
- a connector box attached to the enclosure for receiving the receptacle base, the receptacle base providing an interface between the plug unit and the functional insert and wherein each side-wall of the enclosure includes slits for forming a flexible side panel in each side-wall.

14. The electrical box of claim 13, wherein the receptacle base includes an input connector module for receiving the plug unit.

15. The electrical box of claim 14, wherein the receptacle base includes an output connector module for receiving another plug unit.

16. The electrical box of claim 13, wherein the slits in each side-wall are parallel to each other.

17. The electrical box of claim 13, wherein each side-wall of the electrical box includes a connection groove for receiving a spline for securing a pair of adjacent electrical boxes together.

18. The electrical box of claim 17, wherein each connection groove extends from a face of the enclosure to a rear of the enclosure.

19. The electrical box of claim 18, wherein each connection groove has a cross-sectional T-shape.

20. An electrical box for insertion into a wall opening and for receiving a plug unit connected to a wiring cable, the electrical box configured for receiving a functional insert, and having a retaining tab for securing the electrical box to the wall, comprising:
- an enclosure for receiving the functional insert;
- a receptacle base electrically connectable between the plug unit and the functional insert; and,
- a connector box attached to the enclosure for receiving the receptacle base, the receptacle base providing an interface between the plug unit and the functional insert and wherein slits in each side-wall are parallel to each other.

* * * * *